US 12,111,157 B2

(12) United States Patent
Shimizu et al.

(10) Patent No.: US 12,111,157 B2
(45) Date of Patent: Oct. 8, 2024

(54) INFORMATION PROCESSING SYSTEM, INFORMATION PROCESSING DEVICE, AND INFORMATION PROCESSING METHOD

(71) Applicant: AEROSENSE INC., Tokyo (JP)

(72) Inventors: Satoru Shimizu, Tokyo (JP); Kohtaro Sabe, Tokyo (JP); Tomohiro Maeshiro, Kanagawa (JP); Kousuke Suzuki, Tokyo (JP); Sho Murakoshi, Tokyo (JP)

(73) Assignee: AEROSENSE INC., Tokyo (JP)

( * ) Notice: Subject to any disclaimer, the term of this patent is extended or adjusted under 35 U.S.C. 154(b) by 922 days.

(21) Appl. No.: 16/994,682

(22) Filed: Aug. 17, 2020

(65) Prior Publication Data

US 2020/0379126 A1    Dec. 3, 2020

Related U.S. Application Data

(62) Division of application No. 15/718,670, filed on Sep. 28, 2017, now Pat. No. 10,761,217.

(30) Foreign Application Priority Data

Mar. 9, 2017    (JP) .................................. 2017-045005

(51) Int. Cl.
*G01C 15/04*    (2006.01)
*G01C 11/02*    (2006.01)
(Continued)

(52) U.S. Cl.
CPC .............. *G01C 15/04* (2013.01); *G01C 11/02* (2013.01); *G01S 17/89* (2013.01); *G01S 19/485* (2020.05);
(Continued)

(58) Field of Classification Search
CPC ........ G01C 15/02; G01C 15/04; G01C 15/06; G01C 11/02; G01S 19/485; G01S 19/15; G06T 7/10; G06T 7/70; G06V 20/17
See application file for complete search history.

(56) References Cited

U.S. PATENT DOCUMENTS 2,256,412 A    9/1941    Scott
6,067,085 A    5/2000    Modh et al.
(Continued)

FOREIGN PATENT DOCUMENTS

JP    2002-211494    7/2002
JP    2004-012395 A    1/2004
(Continued)

OTHER PUBLICATIONS

Office Action issued on Jul. 12, 2022, in corresponding Japanese patent Application No. 2021-118831, 5 pages.
(Continued)

*Primary Examiner* — Whitney Moore
(74) *Attorney, Agent, or Firm* — XSENSUS LLP

(57) ABSTRACT

There is provided an information processing system including: a plurality of survey markers each including a GNSS reception unit that receives a signal from a GNSS satellite; a first position measurement unit that measures a ground position of at least one survey marker on the basis of the signals received by the plurality of survey markers; and a processing unit that detects the survey marker from a captured image captured by a UAV and including the survey marker, and associates a position of the detected survey marker in the captured image with the ground position.

12 Claims, 24 Drawing Sheets

(51) Int. Cl.

| | | |
|---|---|---|
| *G01S 17/89* | (2020.01) | |
| *G01S 19/10* | (2010.01) | |
| *G01S 19/45* | (2010.01) | |
| *G01S 19/48* | (2010.01) | |
| *G06T 7/70* | (2017.01) | |
| *G06V 20/17* | (2022.01) | |

(52) U.S. Cl.
CPC ............... *G06T 7/70* (2017.01); *G06V 20/17* (2022.01); *G01S 19/10* (2013.01); *G01S 19/45* (2013.01)

(56) References Cited

U.S. PATENT DOCUMENTS

| | | | |
|---|---|---|---|
| 6,621,921 | B1 | 9/2003 | Matsugu et al. |
| 9,020,666 | B2 * | 4/2015 | Ohtomo ................. G08G 5/025 |
| | | | 701/15 |
| 9,964,951 | B1 * | 5/2018 | Dunn ........................ G06T 7/70 |
| 10,032,384 | B1 * | 7/2018 | Boyd ................... G08G 5/0069 |
| 10,417,469 | B2 * | 9/2019 | Davidson ................ G01C 21/28 |
| 10,482,775 | B1 * | 11/2019 | Boyd ................... G08G 5/0026 |
| 10,761,217 | B2 * | 9/2020 | Shimizu ................ G01S 7/4972 |
| 2008/0096660 | A1 | 4/2008 | Ota |
| 2012/0078451 | A1 | 3/2012 | Ohtomo et al. |
| 2014/0103634 | A1 | 4/2014 | O'boyle et al. |
| 2017/0213062 | A1 * | 7/2017 | Jones ................... G06V 30/413 |
| 2018/0307933 | A1 | 10/2018 | Iwaki |
| 2019/0147260 | A1 | 5/2019 | May |

FOREIGN PATENT DOCUMENTS

| | | | |
|---|---|---|---|
| JP | 2004-045158 A | 2/2004 | |
| JP | 2005-062143 A | 3/2005 | |
| JP | 2005-263112 | 9/2005 | |
| JP | 2006-27331 | 2/2006 | |
| JP | 2006-200951 A | 8/2006 | |
| JP | 2006-200952 A | 8/2006 | |
| JP | 2012-071645 A | 4/2012 | |
| JP | 2013-062108 A | 4/2013 | |
| JP | 2016-085100 A | 5/2016 | |
| JP | 2016-153726 A | 8/2016 | |
| JP | 2016-194515 A | 11/2016 | |
| WO | WO-2017024358 A1 * | 2/2017 | ............. G01C 11/00 |

OTHER PUBLICATIONS

English language abstract of CN 105243481 published Jan. 13, 2016 (Year: 2016).

Agisoft PhotoScan User Manual, Professional Edition, Version 1.2, Agisoft LLC, 2016, 13 pages.

Tutorial (Intermediate level): Coded Targets & Scale Bars in Agisoft PhotoScan Pro 1.1, 2019, 5 pages.

Rice Growth Monitoring using Drone with English translation, 2017, 35 pages.

Sung Joon Ahn, et al., Circular Coded Target for Automation of Optical 3D-Measurement and Camera Calibration, International Journal of Pattern Recognition and Artificial Intelligence, vol. 15, No. 6, 2001, 16 pages.

\* cited by examiner

14A(DSM)    14B(DEM)

FIG. 15
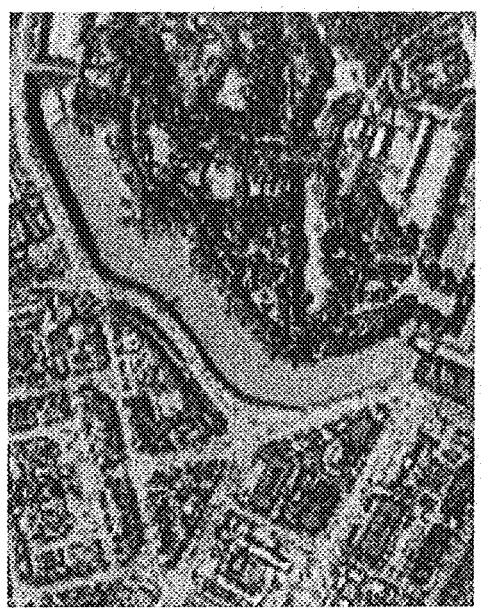 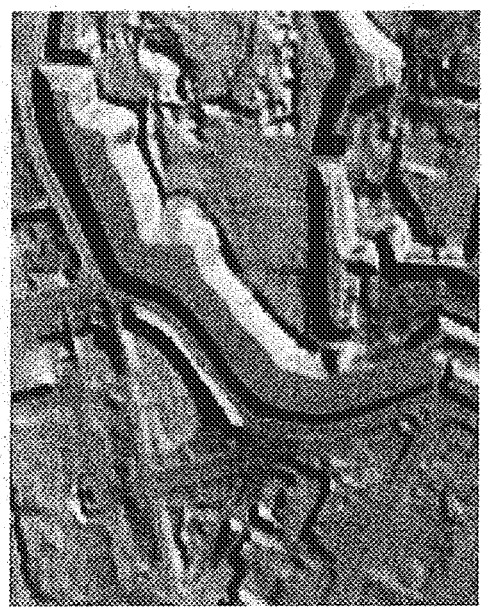
15A(DSM) 15B(DEM)

INFORMATION PROCESSING SYSTEM, INFORMATION PROCESSING DEVICE, AND INFORMATION PROCESSING METHOD

CROSS REFERENCE TO RELATED APPLICATIONS

This application is a divisional of U.S. application Ser. No. 15/718,670, filed Sep. 28, 2017, which claims the benefit of Japanese Priority Patent Application 2017-045005, filed Mar. 9, 2017, the entire contents of each are incorporated herein by reference.

BACKGROUND

The present disclosure relates to an information processing system, an information processing device, and an information processing method.

Recent years have seen research on a technology of capturing a plurality of images including survey markers installed on the ground surface from the sky, detecting a survey marker from a captured image obtained by the image capturing, and measuring a ground position (e.g., latitude, longitude, and altitude) of the survey marker in the captured image at the same time, thereby correcting 3D model data created in advance on the basis of the captured image. In the technology, it is important to measure the ground position of the survey marker with higher precision in order to enhance the precision of 3D model data.

Note that JP 2005-263112A discloses a technology of creating, by a global navigation satellite system (GNSS) receiver mounted on an unmanned aerial vehicle (UAV), a flight plan to cause the UAV to fly to a desired position. In addition, JP 2002-211494A discloses a UAV flight planning device in which a user records ground positions of endpoints while moving among the endpoints on the perimeter of a flight region of a UAV, and uses the record for flight planning of the UAV. In addition, JP 2006-27331A discloses a technology of correcting a position detection error by a GNSS receiver mounted on a UAV on the basis of a measurement result of a separation distance between the UAV and a ground control point, thereby accurately finding the position of a camera used for aerial photography and improving the precision of 3D model data.

SUMMARY

Here, it has been difficult to measure a ground position of a survey marker using an existing technology. For example, in the case where a ground position of a survey marker is measured by ground survey equipment, such as a laser measurement device (total station), a larger number of survey markers results in a longer time needed for ground survey. In addition, in the case where a spot where the survey marker is installed is a place difficult for a surveyor to enter (e.g., a mountainous area), it may be difficult for the surveyor to even carry the ground survey equipment. Therefore, the work of ground survey increases the number of steps needed for UAV photogrammetry, hindering the widespread use of UAV photogrammetry.

In addition, in ground survey using existing ground survey equipment, since the position of the ground survey equipment needs to be adjusted to match the center of the survey marker, the surveyor is required to have expertise therefor. Moreover, the precision of ground survey is influenced by the skill of each surveyor. Furthermore, in ground survey, existing ground survey equipment is installed to cover a survey marker and therefore the survey marker is not aerially photographed appropriately; thus, a surveyor cannot perform ground survey and aerial photography using a UAV at the same time in parallel.

Hence, the present disclosure provides a novel and improved information processing system, information processing device, and information processing method that are capable of measuring a ground position of a survey marker by an easier method.

According to an embodiment of the present disclosure, there is provided an information processing system including: a plurality of survey markers each including a GNSS reception unit that receives a signal from a GNSS satellite; a first position measurement unit that measures a ground position of at least one survey marker on the basis of the signals received by the plurality of survey markers; and a processing unit that detects the survey marker from a captured image captured by a UAV and including the survey marker, and associates a position of the detected survey marker in the captured image with the ground position.

According to an embodiment of the present disclosure, there is provided an information processing device including: a first position measurement unit that measures, on the basis of each of signals from a GNSS satellite received by a plurality of survey markers, a ground position of at least one survey marker; and a processing unit that detects the survey marker from a captured image captured by a UAV and including the survey marker, and associates a position of the detected survey marker in the captured image with the ground position.

According to an embodiment of the present disclosure, there is provided an information processing method including: measuring, on the basis of each of signals from a GNSS satellite received by a plurality of survey markers, a ground position of at least one survey marker; and detecting the survey marker from a captured image captured by a UAV and including the survey marker, and associating a position of the detected survey marker in the captured image with the ground position.

According to an embodiment of the present disclosure, there is provided an information processing system including: a plurality of survey markers each including a GNSS reception unit that receives a signal from a GNSS satellite; a first position measurement unit that measures a ground position of at least one survey marker on the basis of the signals received by the plurality of survey markers; and a processing unit that detects a point corresponding to the survey marker from point cloud data corresponding to reflection points of laser light, and associates the point with the ground position, the point cloud data being generated by applying a plurality of beams of laser light and detecting reflected light reflected off the ground surface by a laser sensor included in a UAV.

According to an embodiment of the present disclosure, a ground position of a survey marker can be measured by an easier method.

Note that the effects described above are not necessarily limitative. With or in the place of the above effects, there may be achieved any one of the effects described in this specification or other effects that may be grasped from this specification.

BRIEF DESCRIPTION OF THE DRAWINGS

FIG. 15 illustrates specific examples of a DSM and a DEM;

DETAILED DESCRIPTION OF THE EMBODIMENT(S)

Figure 1:
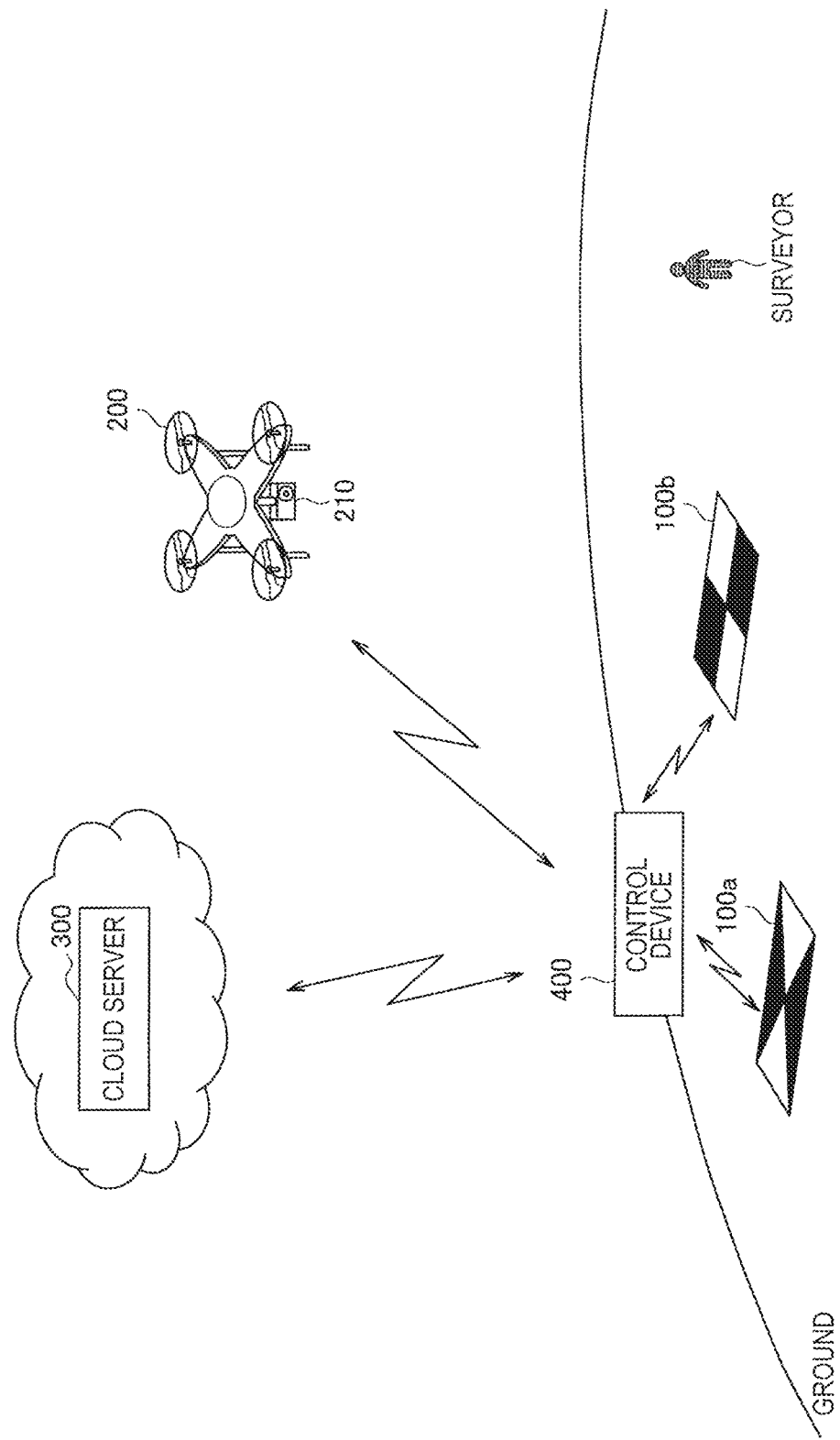
FIG. 1 illustrates a configuration of an information processing system according to a first embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.
1. First embodiment
1-1. Configuration of information processing system
1-2. Background
1-3. Overview of function of information processing system
1-4. Functional configuration of each device
1-5. Procedure and operation of each device in soil volume survey
2. second embodiment
3. third embodiment
4. Modification example of survey marker
5. Application examples of information provided from position measurement unit
6. Hardware configuration of each device
7. Conclusion

1. FIRST EMBODIMENT (1-1. Configuration of Information Processing System)

Embodiments of an information processing system according to the present disclosure are described below. Although the embodiments below describe a case where an information processing system according to an embodiment of the present disclosure is a system that performs soil volume survey, without being limited to this example, an information processing system according to an embodiment of the present disclosure may be used for other purposes.

First, a configuration of an information processing system according to a first embodiment of the present disclosure is described with reference to FIG. 1. FIG. 1 illustrates a configuration of an information processing system according to a first embodiment.

As illustrated in FIG. 1, the information processing system according to the present embodiment includes survey markers 100, a UAV 200, a cloud server 300, and a control device 400. The UAV 200 is equipped with a camera 210.

In the information processing system according to the present embodiment, soil volume survey is performed by the UAV 200. More specifically, the UAV 200 captures, from the sky, an image including the survey marker 100 installed on the ground surface, and the generated captured image is analyzed; thus, 3D model data is generated, and soil volume survey is performed on the basis of the 3D model data. The UAV 200 according to the present embodiment is a type of so-called drone, and is a flying object including a plurality of propellers and a motor.

The survey marker 100 according to the present embodiment functions as a control point used for soil volume survey. More specifically, a surveyor of soil volume survey installs the survey marker 100 at predetermined intervals (e.g., approximately several hundreds of meters) in a target region to be subjected to soil volume survey, and images of the target region are captured from the sky by the camera 210 mounted on the UAV 200. After that, positions (e.g., latitude, longitude, and altitude) of a plurality of survey markers 100 detected from the captured images are associated with information of ground positions of spots where the respective survey markers 100 are installed; thus, 3D model data of the ground is accurately corrected, and soil volume survey is performed on the basis of the 3D model data.

Here, examples of the survey marker 100 according to the present embodiment will be described with reference to FIG.

Figure 2:
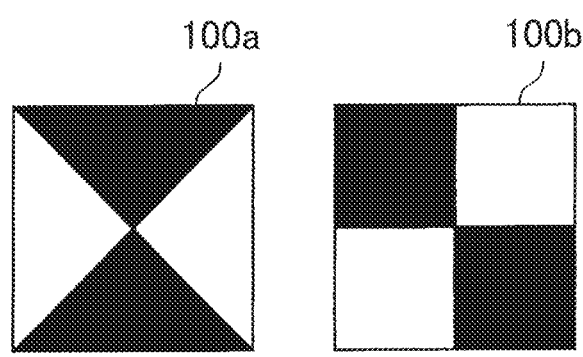
FIG. 2 illustrates examples of a survey marker according to the first embodiment.

2. FIG. 2 illustrates examples of the survey marker 100 according to the present embodiment. Like a survey marker 100a in FIG. 2, the survey marker 100 may be a marker that has a square (or quadrangular) shape in which regions separated by diagonal lines drawn from opposing vertices of the square are colored. Like a survey marker 100b in FIG. 2, the survey marker 100 may be a marker in which a square is separated into four small square regions and each region is colored. A device that analyzes a captured image detects the survey marker 100 from the captured image on the basis of the shape, pattern, or color of the mark.

In addition, the survey marker 100 according to the present embodiment is equipped with a GNSS receiver. Details will be given later. Note that GNSS refers to a satellite positioning system, such as GPS. GLONASS, Galileo, or quasi-zenith satellites. In the present embodiment, a single satellite positioning system may be used for positioning processing, or a plurality of satellite positioning systems may be used for positioning processing.

The UAV 200 is a flying object that aerially photographs a target region of soil volume survey where the survey marker 100 is installed. More specifically, the UAV 200 autonomously flies on the basis of a flight path or the like set in advance, and aerially photographs, using the mounted camera 210, the target region where the survey marker 100 is installed. Then, a plurality of pieces of captured image data generated at respective image capturing positions by the camera 210 are uploaded to the cloud server 300 described later.

The cloud server 300 is an information processing device that analyzes captured image data. More specifically, the cloud server 300 analyzes captured image data generated by the camera 210 of the UAV 200 to create provisional 3D model data. In addition, the cloud server 300 detects the survey marker 100 from the captured image data, and performs processing such as associating position information of the detected survey marker 100 with information of a ground position where each survey marker 100 is installed. After that, the cloud server 300 corrects the provisional 3D model data created in advance, on the basis of a result of the processing, and performs soil volume survey on the basis of the corrected 3D model data.

The control device 400 is an information processing terminal including a dedicated device that functions as a ground control station (GCS) or a ground station (GS). Alternatively, the control device 400 may be implemented by a device with a communication function, such as a personal computer (PC), a tablet PC, or a smartphone, executing a program for causing the device to function as a GCS or a GS.

In accordance with manipulation by the surveyor, the control device 400 performs wireless communication with the UAV 200, and performs control of the flight of the UAV 200, acquisition of the position of the UAV 200, control of image capturing by the camera 210 mounted on the UAV 200, and the like. In addition, the control device 400 may control various devices (e.g., the survey marker 100 or the cloud server 300) other than the UAV 200 and the camera 210. Note that the control device 400 according to the present embodiment can achieve various functions by performing wireless communication with the survey marker 100. Details will be given later.

(1-2. Background)

The configuration of the information processing system according to the first embodiment has been described. Now, the background of the present disclosure will be described.

In recent years, a technology for generating 3D model data of the real world easily at low cost has been required in various fields. For example, in the civil engineering field or the architecture field, a technology for generating 3D model data of a civil engineering site or an architectural structure is required for construction progress management, maintenance inspection, or the like. Alternatively, in the archeology field or the tourism field, a technology for generating 3D model data of a historical architectural structure or remains as digital archives is required.

Technologies for generating 3D model data mainly include "ground laser survey", "airborne laser survey" "UAV photogrammetry", and "UAV laser survey", in recent years, "UAV photogrammetry" has been particularly attracting attention because of improvements in cost, precision, and number of steps needed for survey of a UAV.

To enable survey with high precision in UAV photogrammetry, for example, survey markers are installed on the ground, a ground position of each survey marker is measured with a precision of approximately 1 to 2 [cm] using ground survey equipment, such as a laser measurement device (total station), and 3D model data is corrected on the basis of a result of the measurement. A larger number of survey markers results in a longer time needed for ground survey. In addition, in the case where a spot where the survey marker is installed is a place difficult for a surveyor to enter (e.g., a mountainous area), it may be difficult for the surveyor to even carry the ground survey equipment. Therefore, the work of ground survey increases the number of steps needed for UAV photogrammetry, hindering the widespread use of UAV photogrammetry.

In addition, in ground survey using existing ground survey equipment, since the position of the ground survey equipment needs to be adjusted to match the center of the survey marker, the surveyor is required to have expertise therefor. Moreover, the precision of ground survey is influenced by the skill of each surveyor. Furthermore, in ground survey, existing ground survey equipment is installed to cover a survey marker and therefore the survey marker is not aerially photographed appropriately; thus, a surveyor cannot perform ground survey and aerial photography using a UAV at the same time in parallel.

The present disclosure has been devised in view of the above circumstances. The survey marker 100 according to the present embodiment is equipped with a position measurement unit including a GNSS receiver and thus can measure a ground position of the own device. This enables a surveyor of UAV photogrammetry to reduce resources needed for ground survey. In addition, the surveyor can measure ground positions of a plurality of survey markers 100 at the same time in parallel. Moreover, the surveyor can obtain a measurement result with stable precision more easily, even without having expertise like that for ground survey. Furthermore, the surveyor can perform measurement of a ground position of the survey marker 100 and aerial photography using a UAV at the same time in parallel. According to the above description, an information processing system according to an embodiment of the present disclosure can reduce resources needed for generation of 3D model data and soil volume survey, as compared with an existing technology.

The present embodiment is described in detail below; as a premise for the description, an overview of positioning using a GNSS receiver will be described.

In positioning using a GNSS receiver, "point positioning" is generally performed, in which one receiver receives radio signals from four or more GNSS satellites, and a separation distance between each GNSS satellite and the receiver is calculated using these signals; thus, positioning is performed.

On the other hand, technological innovation in recent years has facilitated relative positioning, in which a plurality of receivers receive radio signals from four or more GNSS satellites at the same time, and a relative positional relationship between the plurality of receivers is calculated using these signals. Among relative positioning methods, a positioning method called interferometric positioning, in which a difference (path difference) between distances from two receivers to a predetermined GNSS satellite is calculated on the basis of a phase of a carrier wave, and a base line vector (distance and direction) is decided, is considered to have relatively high precision (considered to be able to measure with a precision of the order of millimeters). Interferometric positioning is divided into a static method, a real-time kinematic (RTK) method, and the like, depending on how positioning is carried out.

In the static method, a plurality of receivers receive signals from four or more GNSS satellites for a predetermined time (e.g., one hour) or more, and an integer bias of a carrier wavelength is decided on the basis of a temporal change in position of the GNSS satellites. The static method needs a relatively longer time for positioning than other methods, but may be expected to offer a high precision of the order of millimeters.

In the RTK method, an integer bias of a carrier wavelength is decided at the start of observation, and after that, communication of observation data is performed by wireless communication between receivers; thus, positioning processing is performed in real time. The RTK method needs a shorter time for positioning than other methods, but its precision is considered to be inferior to the static method, being approximately several centimeters.

Since interferometric positioning measures a relative positional relationship between a plurality of receivers, it is basically required that one of the receivers be a reference station (a receiver whose position is known). Here, interferometric positioning is performed beforehand using one of the receivers as an observation point and a GNSS-based control station provided by Geospatial Information Authority of Japan as a reference station; thus, the absolute position of the receiver serving as the observation point is measured. After that, the observation point whose absolute position has been measured may be used as a reference station to measure the absolute position of another receiver.

In this specification, a case where positioning processing by the static method is performed is described as a first embodiment, and a case where positioning processing by the RTK method is performed is described as a second embodiment. In addition, although it is described below for convenience that "a ground position of the survey marker 100 is measured", measuring a ground position of the survey marker 100 is equivalent to measuring a ground position of a position measurement unit 110 in the present embodiment. That is, "aground position of the survey marker 100" may be interpreted as "a ground position of the position measurement unit 110".

(1-3. Overview of Function of Information Processing System)

The background of the present disclosure has been described. Now, an overview of a function of the information processing system according to the present embodiment will be described.

As described above, the survey marker 100 according to the present embodiment is equipped with a position measurement unit including a GNSS receiver. Thus, the information processing system according to the present embodiment can measure the position of the survey marker 100 using GNSS observation data acquired by the GNSS receiver.

More specifically, the position measurement unit of the survey marker 100 according to the present embodiment performs processing of point positioning using GNSS observation data, thereby measuring a ground position of the survey marker 100, and stores the GNSS observation data. Here, for a device other than the survey marker 100 (e.g., an external PC) to perform positioning calculation, the external PC is provided with raw data before positioning calculation. In the following description, data before positioning calculation received from GNSS satellites is called "RAW data" for convenience. RAW data includes at least phase data of carrier waves of signals received from the GNSS satellites.

After that, the RAW data is taken out of the survey marker 100 by a predetermined method, and uploaded to the cloud server 300. Then, the cloud server 300 performs positioning processing by the static method using the RAW data, thereby measuring aground position of the survey marker 100 in more detail. Thus, the cloud server 300 is assigned with positioning processing with greater load, which can reduce the load of the GNSS receiver included in the survey marker 100. In other words, the GNSS receiver need not have a high-performance processing function; thus, survey cost may be reduced.

Figure 3:
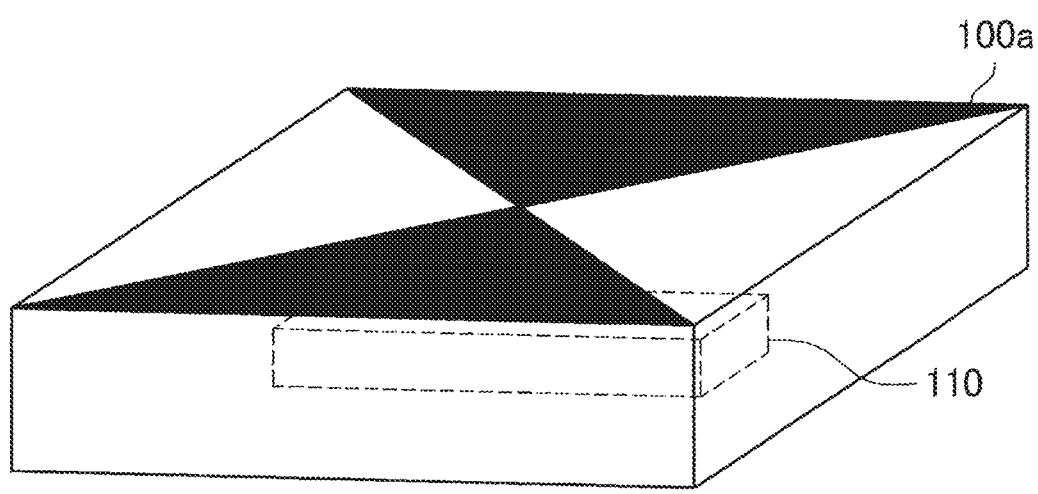
FIG. 3 is an enlarged view of an example of a survey marker according to the first embodiment.

Now, the survey marker 100 according to the present embodiment will be specifically described with reference to FIG. 3. FIG. 3 is an enlarged view of an example of the survey marker 100 according to the present embodiment. As illustrated in FIG. 3, the survey marker 100 according to the present embodiment includes the position measurement unit 110, and the position measurement unit 110 includes a GNSS receiver.

Here, the position measurement unit 110 (to be exact, an antenna of the position measurement unit 110) is preferably provided at a position close to the center of the survey marker 100. For example, for the survey marker 100 in which diagonal lines are drawn from opposing vertices of a square (quadrangle) as in FIG. 3, the position measurement unit 110 is preferably provided at a position close to the intersection of two diagonal lines (or directly above or directly below the intersection). Here, since the position, in a captured image, of the survey marker 100 detected from the captured image is the center of the survey marker 100, providing the position measurement unit 110 at the center of the survey marker 100 enables, in a later step, the position of the survey marker 100 in the captured image to be associated appropriately with a ground position of the survey marker 100 measured by the position measurement unit 110.

(1-4. Functional Configuration of Each Device)

The overview of the function of the information processing system according to the present embodiment has been described. Now, a functional configuration of each device according to the present embodiment will be described with reference to FIGS. 4 to 6.

(Functional Configuration of Position Measurement Unit 110)

Figure 4:
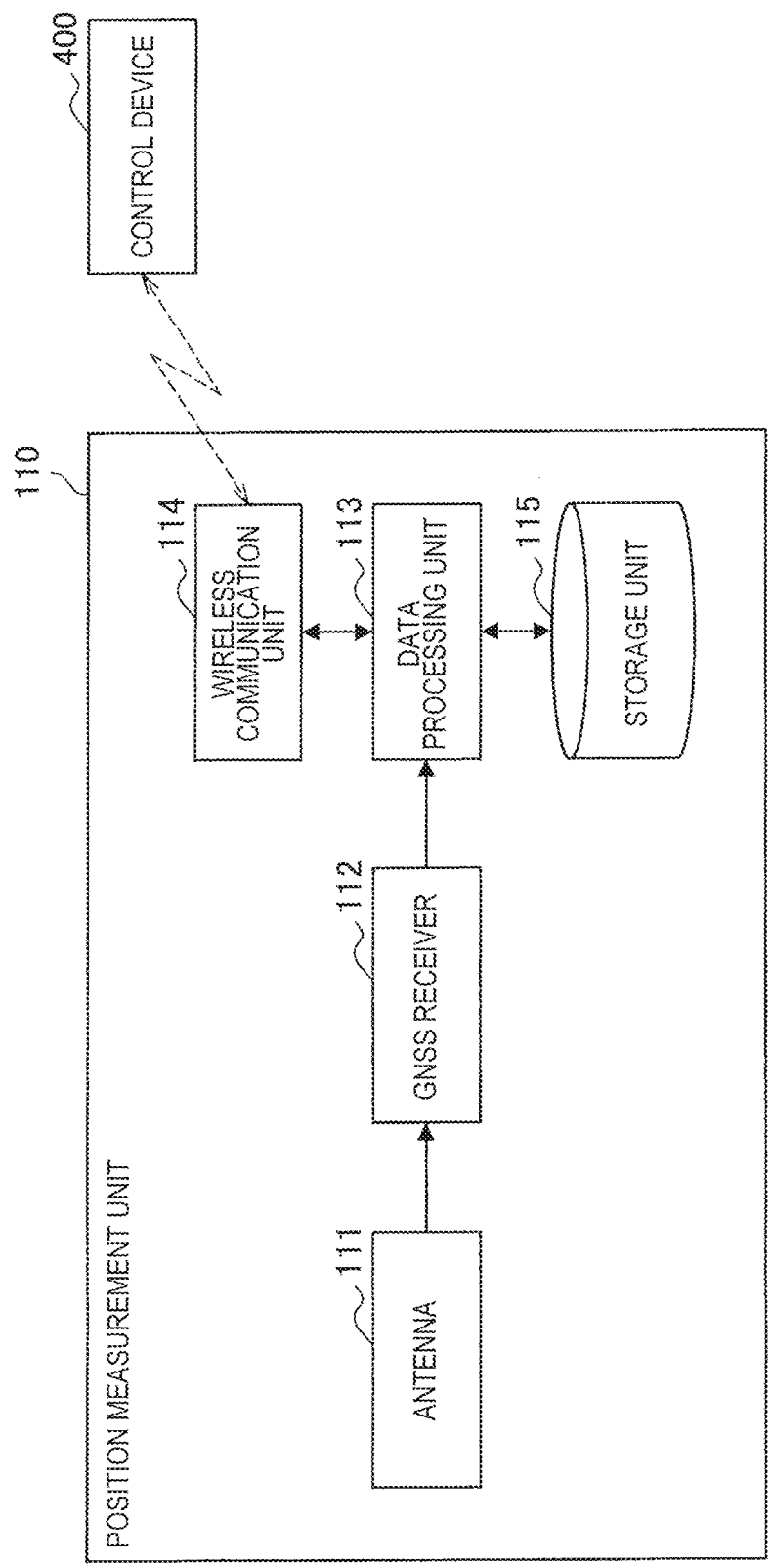
FIG. 4 is a block diagram illustrating a functional configuration of a position measurement unit according to the first embodiment.

FIG. 4 is a block diagram illustrating a functional configuration of the position measurement unit 110 included in the survey marker 100. As illustrated in FIG. 4, the position measurement unit 110 according to the present embodiment includes an antenna 111, a GNSS receiver 112, a data processing unit 113, a wireless communication unit 114, and a storage unit 115.

The antenna 111 functions as a GNSS reception unit that receives radio signals from GNSS satellites, and provides the radio signals to the GNSS receiver 112 described later.

The GNSS receiver 112 extracts GNSS observation data from the radio signals received by the antenna 111. Note that the GNSS receiver 112 may function as a GNSS reception unit together with the antenna 111.

In addition, the GNSS receiver 112 includes an RF circuit and a baseband circuit, and also functions as a second position measurement unit that performs positioning processing by a point positioning method using GNSS observation data, thereby measuring a ground position (second ground position) of the survey marker 100. Note that in order for the cloud server 300 to perform positioning processing based on the static method, the GNSS receiver 112 outputs RAW data as well as ground position information generated by the point positioning method. The GNSS receiver 112 provides ground position information generated by the point positioning method and RAW data to the data processing unit 113 described later.

The data processing unit 113 performs various types of data processing. For example, the data processing unit 113 causes the storage unit 115 described later to store ground position information and RAW data output by the GNSS receiver 112. In addition, the data processing unit 113 provides ground position information generated by the point positioning method to the wireless communication unit 114, thereby enabling the wireless communication unit 114 to transmit the information to the control device 400. Note that the data processing unit 113 may perform positioning processing by the point positioning method, instead of the GNSS receiver 112.

The wireless communication unit 114 wirelessly transmits various types of information to the control device 400. For example, the wireless communication unit 114 wirelessly transmits, to the control device 400, ground position information of the survey marker 100 generated by the point positioning method. In addition, for example, the wireless communication unit 114 may wirelessly transmit, to the control device 400, information on GNSS observation data (the information may include, for example, reception strength information of radio signals from the GNSS satellites or position information of the GNSS satellites, but is not limited to such information), identification information of the survey marker 100, and information on remaining battery power or remaining capacity of a storage medium. This enables the control device 400 to achieve various functions. Details will be given in "5. Application examples of information provided from position measurement unit".

The storage unit 115 stores various types of information. For example, the storage unit 115 stores ground position information of the survey marker 100 generated by the point positioning method, RAW data, and the like. Of information stored by the storage unit 115, at least RAW data is taken out of the storage unit 115 by a predetermined method. For example, RAW data is taken out by a removable storage medium or taken out by a cable or the like connected to the storage unit 115. The taken out RAW data is uploaded to the cloud server 300 to be used for positioning processing based on the static method by the cloud server 300.

(Functional Configuration of Cloud Server 300)

Figure 5:
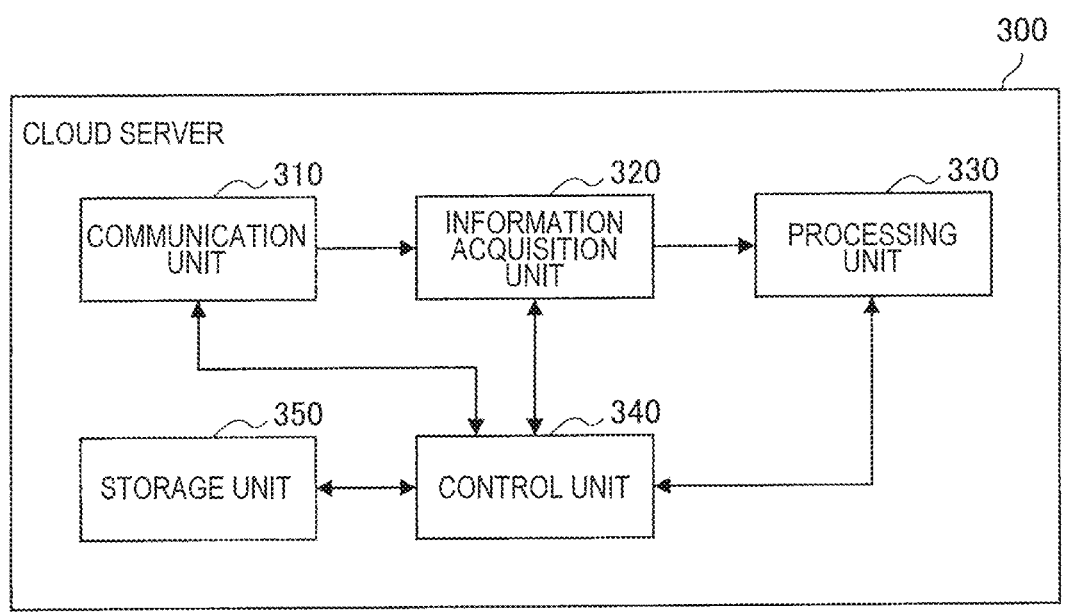
FIG. 5 is a block diagram illustrating a functional configuration of a cloud server according to the first embodiment.

FIG. 5 is a block diagram illustrating a functional configuration of the cloud server 300. As illustrated in FIG. 5, the cloud server 300 according to the present embodiment includes a communication unit 310, an information acquisition unit 320, a processing unit 330, a control unit 340, and a storage unit 350.

The communication unit 310 performs various types of communication. For example, in the case where the surveyor uploads RAW data output by the position measurement unit 110 of each survey marker 100 or captured image data generated by the camera 210, the communication unit 310 receives the uploaded data. The communication unit 310 provides the received various types of information to the information acquisition unit 320 described later.

The information acquisition unit 320 acquires various types of information. For example, the information acquisition unit 320 acquires the RAW data, captured image data, and the like received by the communication unit 310 by reading the data from a memory or the like, and provides the information to the processing unit 330 described later. Note that the information acquisition unit 320 may perform various types of data processing on the acquired information. For example, the information acquisition unit 320 may delete information unnecessary for soil volume survey from the acquired information, or reduce the data amount of captured image data. For example, the information acquisition unit 320 may delete unnecessary images from among images during takeoff or landing, overlapping images during turning, and overlapping images during altitude adjustment, which are acquired in the case where image capturing is performed from before flight to after flight of the UAV 200, or may remove overlapping regions from the acquired plurality of captured images.

The processing unit 330 performs various types of processing related to soil volume survey. For example, the processing unit 330 performs processing of detecting the survey marker 100 from an uploaded captured image. In addition, the processing unit 330 performs positioning processing by the static method using uploaded RAW data, thereby functioning as a first position measurement unit that measures a ground position of each survey marker 100. At this time, the processing unit 330 may perform positioning processing using predetermined software. For example, the processing unit 330 may perform positioning processing using a simple, portable RTK-GPS positioning operation library written in C language, which is called RTKLIB, or a suite of application programs generated using this. Since the RTKLIB is open source software, positioning processing may be achieved at lower cost.

Moreover, the processing unit 330 autonomously associates position information in an image of each survey marker 100 detected from the captured image with ground position information of each survey marker 100. More specifically, to uploaded captured image data is added position information of the UAV 200 or the camera 210 at the point in time each captured image has been captured, and the processing unit 330 can use the information to estimate a rough ground position of each survey marker 100 included in the captured image; therefore, on the basis of this estimation etc., position information of each survey marker 100 in the captured image can be autonomously associated with ground position information. This enables the processing unit 330 to specify a ground position of each survey marker 100 in the captured image.

In addition, the processing unit 330 performs generation processing of 3D model data. More specifically, the processing unit 330 performs processing of connecting a plurality of captured images on the basis of a feature value or the like of each captured image. Then, the processing unit 330 generates provisional 3D model data on the basis of the connected captured images, and then corrects the provisional 3D model data on the basis of a result of the association between position information in the captured image of each survey marker 100 and ground position information, thereby generating final 3D model data. Note that this method is an example, and any method may be used to generate 3D model data. For example, the processing unit 330 may directly generate final 3D model data on the basis of a result of the association between position information in the captured image of each survey marker 100 and ground position information, without generating provisional 3D model data.

Furthermore, the processing unit 330 performs processing related to soil volume survey using the generated 3D model data. For example, the processing unit 330 compares 3D model data generated by the above processing with a land formation plan drawn by 3D CAD (e.g., three-dimensional model data before start of construction and after completion), and calculates a difference or the like. This enables the surveyor to easily perform progress management of construction, for example. Note that the processing unit 330 may perform various types of processing for displaying the difference or the like on a predetermined display.

The control unit 340 performs centralized control on functional configurations of the cloud server 300. For example, on the basis of input by the surveyor, the control unit 340 controls the start of various types of processing described above, or controls processing of providing 3D model data or a soil volume survey result to the surveyor. Note that such processing is an example, and the control unit 340 may control other processing.

The storage unit 350 stores various types of information. For example, the storage unit 350 may store uploaded RAW data or captured image data, 3D model data, or a soil volume survey result. In addition, the storage unit 350 may store a program, parameters, or the like used by functional configurations of the cloud server 300.

(Functional Configuration of Control Device 400)

Figure 6:
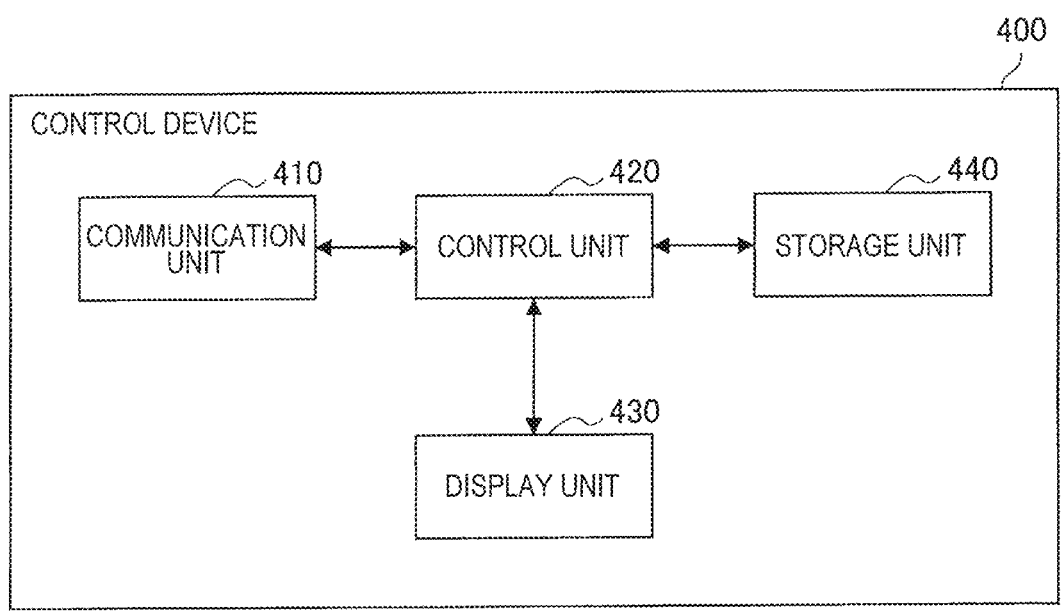
FIG. 6 is a block diagram illustrating a functional configuration of a control device according to the first embodiment.

FIG. 6 is a block diagram illustrating a functional configuration of the control device 400. As illustrated in FIG. 6, the control device 400 according to the present embodiment includes a communication unit 410, a control unit 420, a display unit 430, and a storage unit 440.

The communication unit 410 performs various types of communication. For example, the communication unit 410 functions as a second reception unit that receives, by wireless communication, ground position information of the survey marker 100 generated using the point positioning method by the position measurement unit 110. In addition, for example, the communication unit 410 may receive, from the position measurement unit 110, information on GNSS observation data (the information may include, for example, reception strength information of radio signals from the GNSS satellites or position information of the GNSS satellites, but is not limited to such information), identification information of the survey marker 100, and information on remaining battery power or remaining capacity of a storage medium, as described above. The communication unit 410 provides the received information to the control unit 420 described later.

The control unit 420 performs centralized control on functional configurations of the control device 400. For example, the control unit 420 generates a control signal on the basis of various types of information received by the communication unit 410, and provides the control signal to the display unit 430 described later, thereby functioning as a display control unit that enables display of various types of information by the display unit 430. Note that this control is an example, and the control unit 420 may control any other processing. For example, the control unit 420 may generate a control signal on the basis of various types of information received by the communication unit 410, and provide the control signal to an audio output unit (not illustrated), thereby enabling audio output by the audio output unit. In addition, the control unit 420 functions as a flight path generation unit that autonomously generates a flight path of the UAV 200 on the basis of various types of information received by the communication unit 410. For example, the control unit 420 autonomously calculates a flight path that enables more efficient aerial photography on the basis of ground position information of each survey marker 100, various parameters, and the like. The above processing of the control unit 420 is specifically described in "5. Application examples of information provided from position measurement unit 110".

The display unit 430 displays various objects. More specifically, the display unit 430 displays, on a display, various types of information received from the position measurement unit 110 on the basis of control information provided from the control unit 420. The display contents of the display unit 430 are specifically described in "5. Application examples of information provided from position measurement unit 110".

(1-5. Procedure and Operation of Each Device in Soil Volume Survey)

Figure 7:
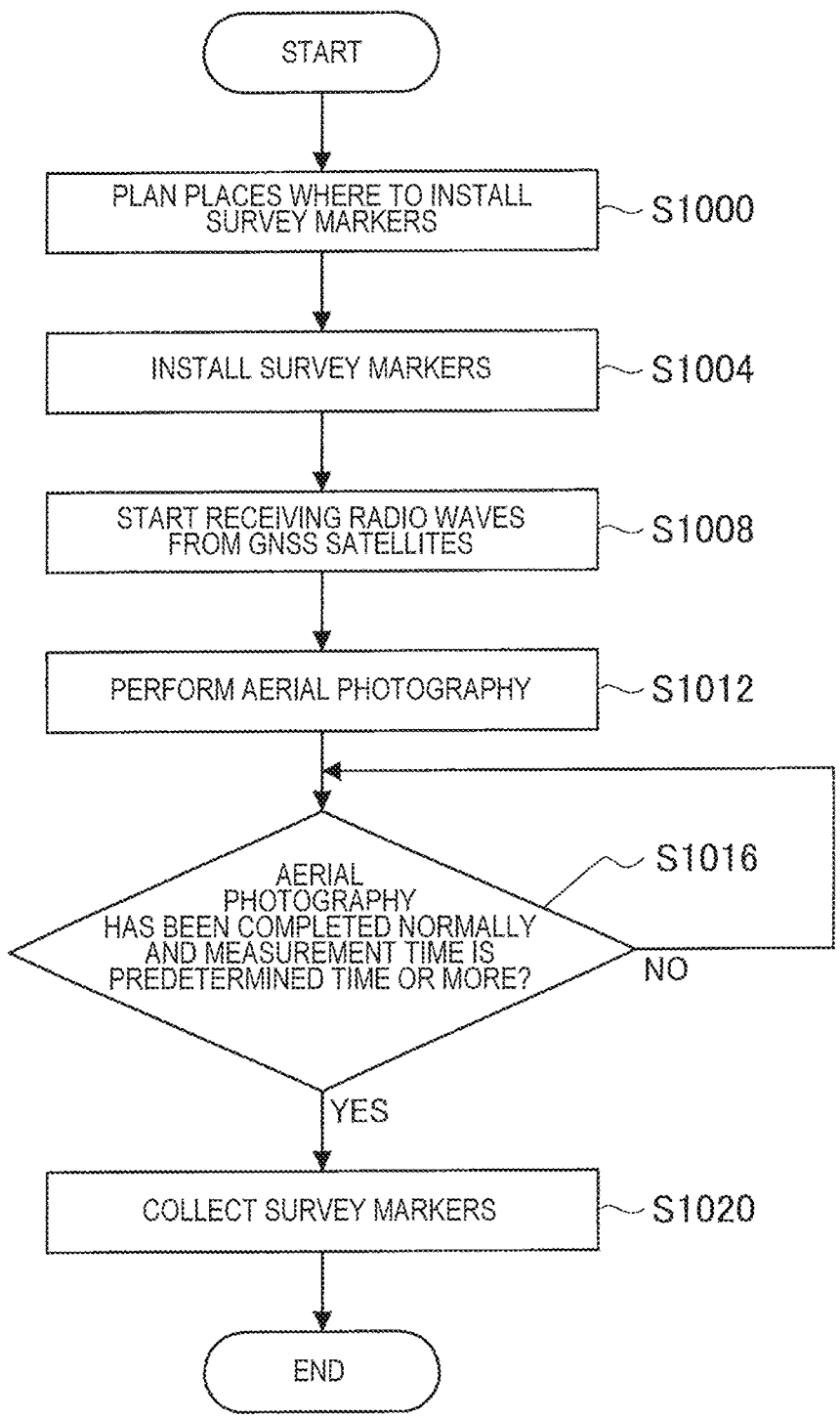
FIG. 7 is a flow chart illustrating a procedure and operation of each device of UAV photogrammetry in the first embodiment.

The functional configuration of each device has been described. Now, a procedure and operation of each device in soil volume survey will be described with reference to FIGS. 7 and 8. First, description is given on a procedure until collection of the survey markers 100, with reference to FIG. 7.

In step S1000, a surveyor of soil volume survey plans, beforehand, places where to install a plurality of survey markers 100, with reference to map information etc. of the neighborhood of a zone to be surveyed. In step S1004, the surveyor installs the survey markers 100 in the planned installation places. In step S1008, the position measurement unit 110 of the survey marker 100 starts receiving radio signals from GNSS satellites. The received radio signals are recorded in chronological order in the storage unit 115 as RAW data. Note that as described above, the position measurement unit 110 may measure a ground position by point positioning, and wirelessly transmit a result of the measurement to the control device 400.

In step S1012, after all the survey markers 100 are installed, the UAV 200 flies over the zone to be surveyed in accordance with a flight path planned beforehand. The camera 210 performs aerial photography including the zone to be surveyed. On this occasion, image capturing time information and image capturing position information are associated with an image captured at each image capturing spot. For example, image capturing time information and image capturing position information are recorded in captured image data in accordance with a predetermined format. In addition, since positioning processing by the static method is performed in the present embodiment, in the case where the surveyor determines that aerial photography has been completed normally and the position measurement unit 110 has received radio signals from the GNSS satellites for a predetermined time (e.g., one hour) or more (step S1016/ Yes), in step S1020, the position measurement unit 110 ends the reception of radio signals from the GNSS satellites, and the survey markers 100 are collected. Thus, since each survey marker 100 has the position measurement unit 110, the UAV 200 can capture a ground image including the survey marker 100 at the same time as and in parallel with the reception of radio signals from the GNSS satellites by the position measurement unit 110 of each survey marker 100.

Figure 8:
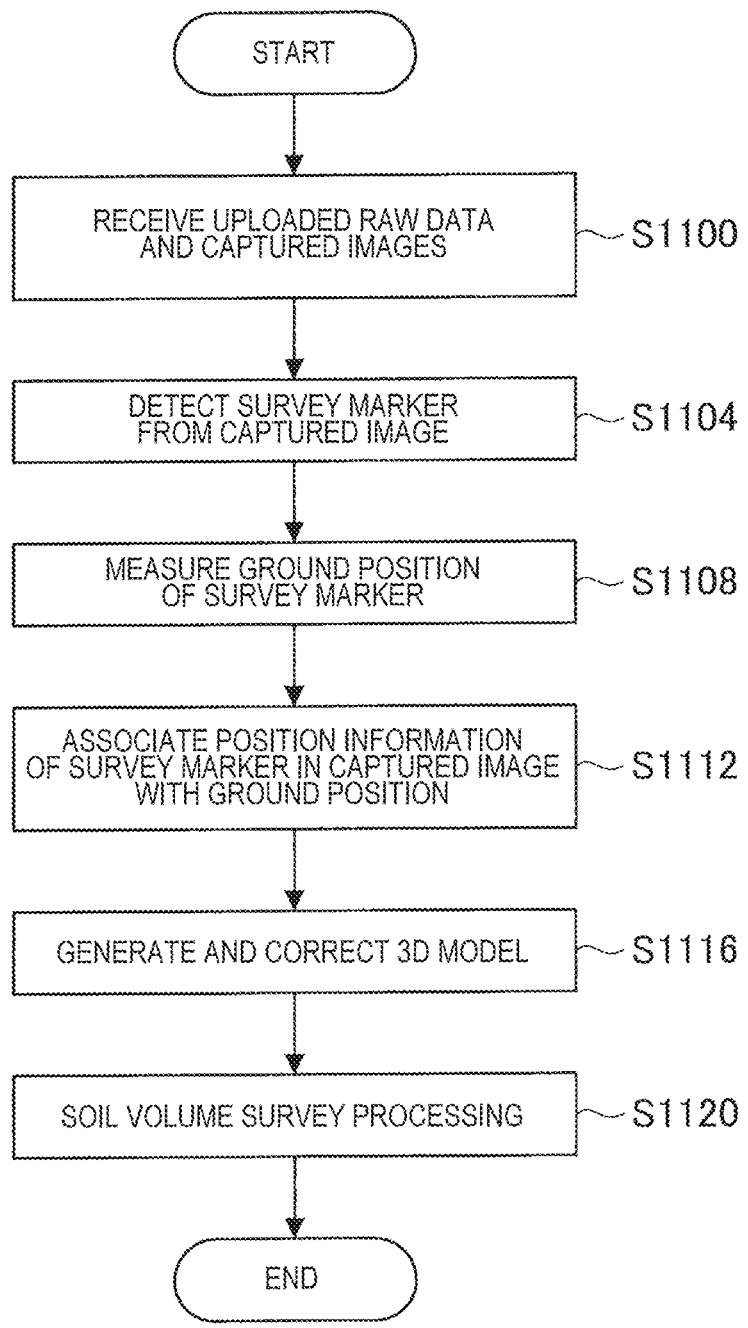
FIG. 8 is a flow chart illustrating a procedure and operation of each device of UAV photogrammetry in the first embodiment.

Now description will be given on a processing procedure for the cloud server 300 to perform generation of 3D model data and the like, with reference to FIG. 8. First, RAW data received by the GNSS receiver 112 of each survey marker 100 and a plurality of pieces of captured image data captured at respective image capturing positions by the camera 210 of the UAV 200 are uploaded to the cloud server 300, the RAW data having been taken out of the plurality of survey markers 100. In step S1100, the cloud server 300 receives the RAW data received by the GNSS receiver 112 of each survey marker 100 and the plurality of pieces of captured image data captured at respective image capturing positions by the camera 210 of the UAV 200, which have been uploaded. In step S1104, the processing unit 330 of the cloud server 300 detects an image of the survey marker 100 from the plurality of pieces of captured image data captured at respective image capturing positions, and performs processing of specifying the position of the survey marker 100 in the captured image. In step S1108, the processing unit 330 performs positioning processing by the static method using the RAW data received by the GNSS receiver 112 of each survey marker 100, thereby measuring a ground position of each survey marker 100.

In step S1112, the processing unit 330 associates position information in the captured image of each survey marker 100 detected from the captured image with ground position information of each survey marker 100 obtained by positioning by the static method. In step S1116, the processing unit 330 generates 3D model data. More specifically, the processing unit 330 connects a plurality of captured images by a predetermined method, generates provisional 3D model data on the basis of the connected captured images, and then corrects the provisional 3D model data on the basis of a result of the association between position information in the captured image of each survey marker 100 and ground position information, thereby generating final 3D model data. In step S1120, the processing unit 330 performs processing related to soil volume survey using the generated 3D model data. For example, the processing unit 330 compares 3D model data with a land formation plan drawn by 3D CAD, and calculates a difference or the like, as described above.

2. SECOND EMBODIMENT

The first embodiment according to the present disclosure has been described. Now, a second embodiment according to the present disclosure will be described. In the first embodiment, the position of the survey marker 100 is measured by the static method, whereas in the second embodiment, the position of the survey marker 100 is measured by the RTK method. In the following description, basically, contents that overlap with the description of the first embodiment are omitted, and description is given on a difference from the first embodiment.

Figure 9:
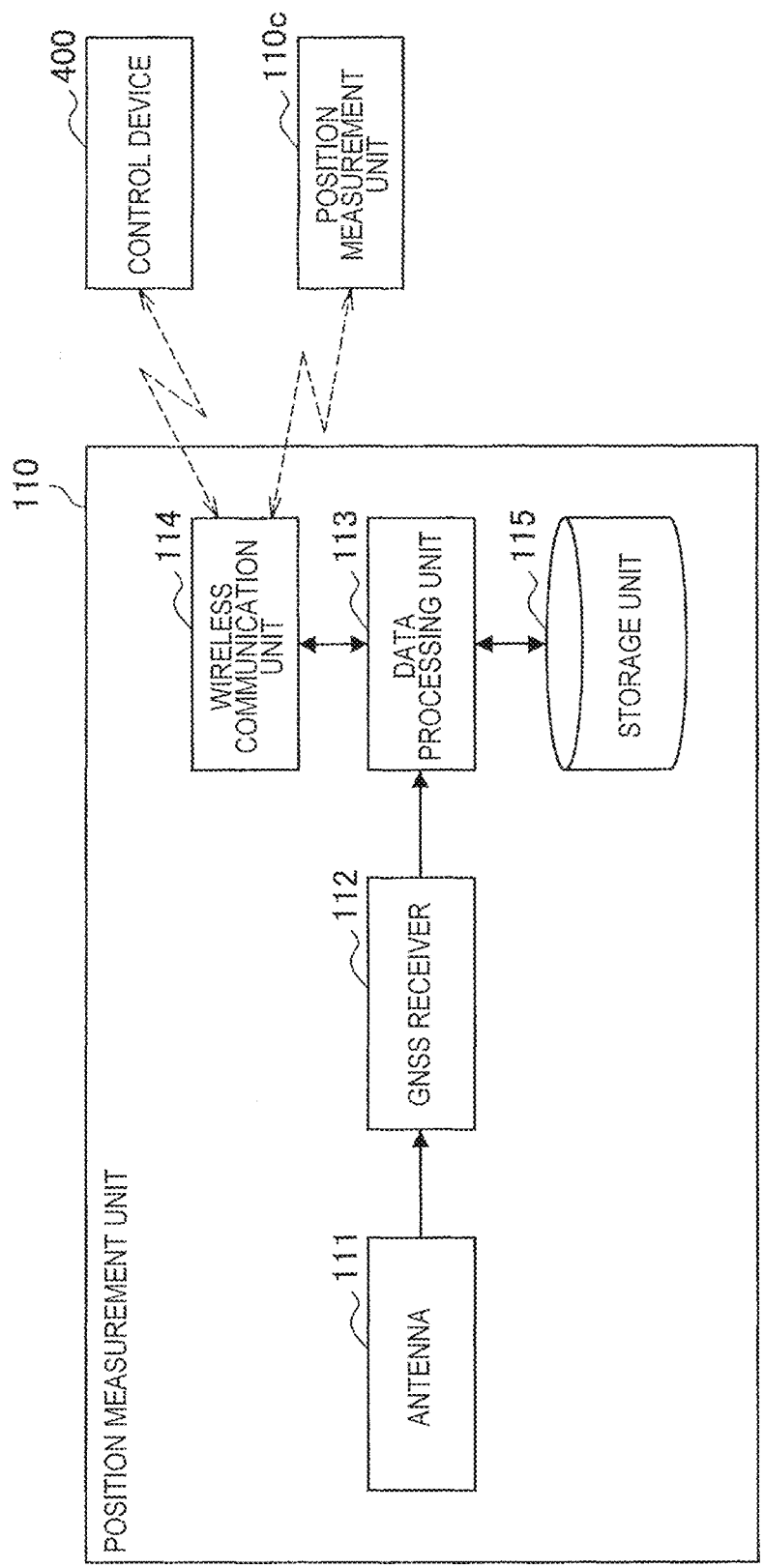
FIG. 9 is a block diagram illustrating a functional configuration of a position measurement unit according to a second embodiment.

First, a functional configuration of the position measurement unit 110 according to the second embodiment is described with reference to FIG. 9. FIG. 9 is a block diagram illustrating a functional configuration of the position measurement unit 110 according to the second embodiment.

The GNSS receiver 112 according to the present embodiment has a positioning processing function by the RTK method. More specifically, the GNSS receiver 112 functions as a first position measurement unit that measures a ground position of the survey marker 100 using GNSS observation data acquired by position measurement units 110 included in two survey markers 100 (the position measurement unit 110 included in the own device and the position measurement unit 110 included in another survey marker 100). As illustrated in FIG. 9, the wireless communication unit 114 according to the present embodiment performs wireless communication with the position measurement unit 110 included in the other survey marker 100 (a "position measurement unit 110*c*" in the drawing), thereby sharing GNSS observation data to be used for positioning processing by the RTK method, and provides the data to the GNSS receiver 112 that performs positioning processing, via the data processing unit 113.

Note that instead of the GNSS receiver 112, the data processing unit 113 may perform positioning processing by the RTK method, or the GNSS receiver 112 and the data processing unit 113 may share positioning processing by the RTK method. Note that the GNSS receiver 112 performs point positioning processing in the first embodiment; also in the second embodiment, the GNSS receiver 112 may perform point positioning processing as well as positioning processing by the RTK method.

The storage unit 115 according to the present embodiment stores ground position information of the survey marker 100 output in positioning processing by the RTK method. Note that the storage unit 115 may store RAW data, as in the first embodiment, as well as ground position information. Thus, for example, in the case where the cloud server 300 has a higher-performance positioning function than the GNSS receiver 112 of the position measurement unit 110, the surveyor can use, as appropriate, a result of positioning processing by the cloud server 300 as well as a positioning result obtained by the GNSS receiver 112.

Figure 10:
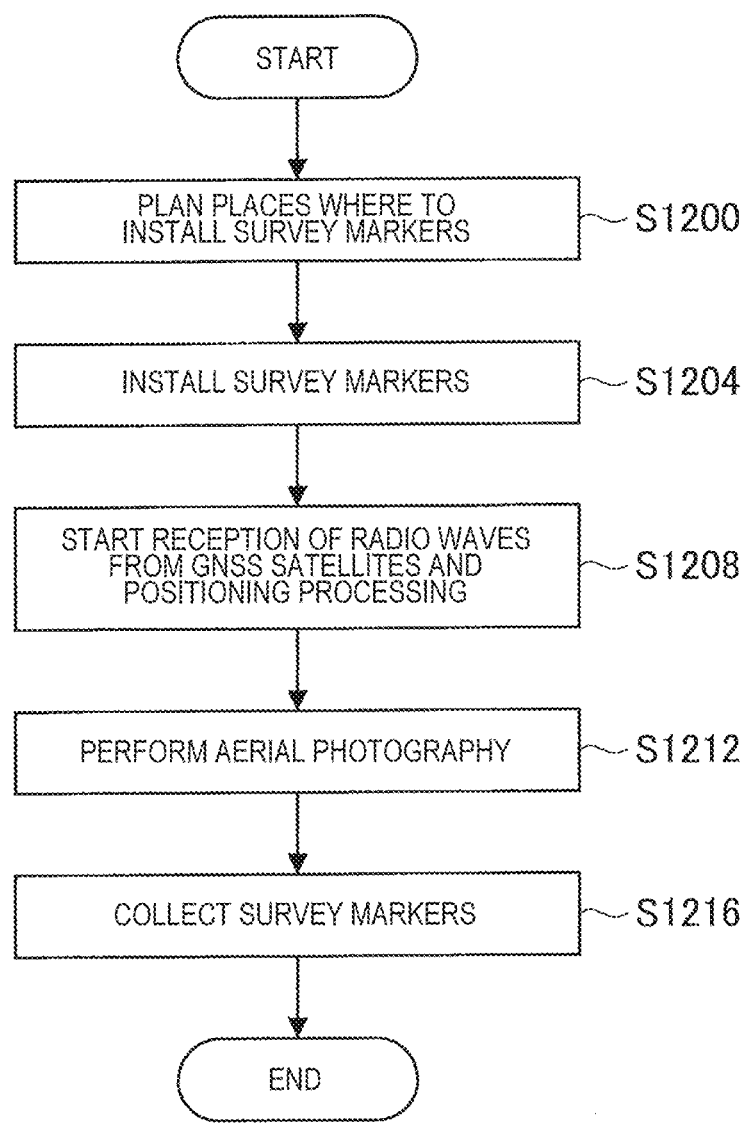
FIG. 10 is a flow chart illustrating a procedure and operation of each device of UAV photogrammetry in the second embodiment.

Now, a procedure until collection of the survey markers 100 in the second embodiment will be described with reference to FIG. 10. Steps S1200 and S1204 are the same as steps S1000 and S1004 in FIG. 7, and description thereof is omitted. In step S1208, the position measurement unit 110 included in the survey marker 100 starts receiving radio signals from GNSS satellites, and also starts positioning processing using the RTK method by sharing GNSS observation data with the position measurement unit 110 included in the other survey marker 100. The RTK method performs positioning processing in real time, unlike the static method; therefore, after aerial photography is performed by the UAV 200 and the camera 210 in step S1212, the survey markers 100 may be collected in step S1216 without a wait for elapse of a predetermined time.

Figure 11:
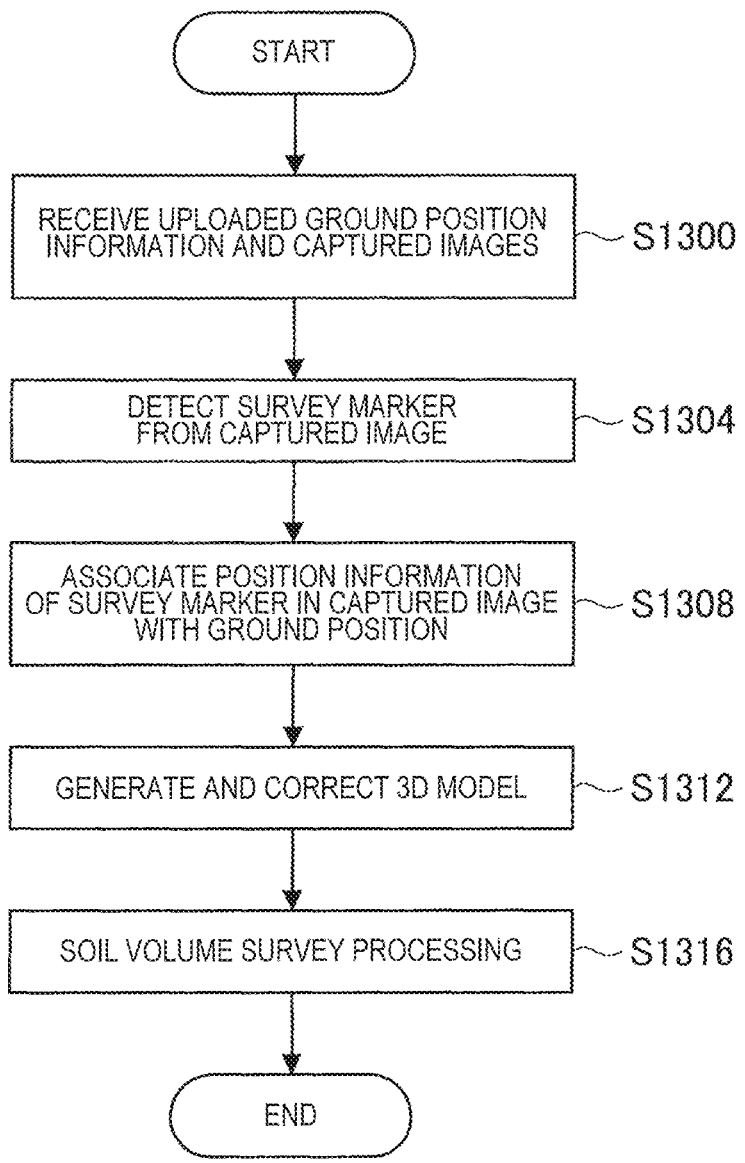
FIG. 11 is a flow chart illustrating a procedure and operation of each device of UAV photogrammetry in the second embodiment.

Now, description will be given on a processing procedure for the cloud server 300 to perform generation of 3D model data and the like in the second embodiment, with reference to FIG. 11. First, ground position information generated by the GNSS receiver 112 of each survey marker 100 and a plurality of pieces of captured image data captured at respective image capturing positions by the camera 210 of the UAV 200 are uploaded to the cloud server 300, the ground position information having been taken out of the plurality of survey markers 100. In step S1300, the cloud server 300 receives the ground position information and the captured image data, which have been uploaded. In step S1304, the processing unit 330 of the cloud server 300 detects an image of the survey marker 100 from the plurality of pieces of captured image data captured at respective image capturing positions, and performs processing of specifying the position of the survey marker 100 in the captured image. In step S1308, the processing unit 330 associates position information in the captured image of each survey marker 100 detected from the captured image with ground position information of each survey marker 100. Operations of steps S1312 and S1316 are similar to the operations of steps S1116 and S1120 in FIG. 8, and description thereof is omitted.

As in the present embodiment, the position measurement unit 110 performs positioning processing based on the RTK method; thus, the cloud server 300 can generate 3D model data and perform soil volume survey processing using uploaded ground position information, without performing positioning processing.

Moreover, in the static method, the surveyor does not find whether RAW data appropriate for subsequent processing has been acquired until after a predetermined time (e.g., after the survey markers 100 are collected). Consequently, if appropriate RAW data has not been acquired, the surveyor may need to redo work such as installation of the survey markers 100, aerial photography, and collection of the survey markers 100. In contrast, since positioning processing is performed in real time in the RTK method, the surveyor can grasp whether appropriate RAW data is acquired and whether positioning processing is performed appropriately.

Note that positioning processing by the RTK method basically has lower precision than positioning processing by the static method in most cases, as described above, but has higher precision than point positioning. Hence, the second embodiment may be used depending on real-time property and desired precision.

Processing of the first embodiment and processing of the second embodiment, which are described above, may be combined as appropriate. For example, ground positions of some of the plurality of survey markers 100 may be found by the static method, which is the first embodiment, and ground positions of the rest of the survey markers 100 may be found by the RTK method, which is the second embodiment. By combining the first embodiment and the second embodiment, the surveyor can flexibly adapt to characteristics of a zone to be surveyed, surrounding environment such as weather, or desired precision.

3. THIRD EMBODIMENT

The second embodiment according to the present disclosure has been described. Now, a third embodiment according to the present disclosure will be described. In the first embodiment and the second embodiment, the present disclosure is applied to UAV photogrammetry, whereas in the third embodiment according to the present disclosure, the present disclosure is applied to UAV laser survey.

In general UAV laser survey, during flight of a UAV, a laser sensor mounted on the UAV applies laser light to the ground surface, and after that, detects laser light reflected off the ground surface. Then, a separation distance between the laser sensor and each spot on the ground surface is measured on the basis of a time difference between a point in time at which laser light is applied by the laser sensor and a point in time at which laser light reflected off the ground surface is detected by the laser sensor. Then, 3D model data of the ground is generated using the measurement result, position information of the UAV obtained by a GNSS receiver and an inertial measurement unit (IMU; for example, a ring laser gyro) mounted on the UAV, and attitude information (including inclination information, for example) of the UAV obtained by the IMU.

Detailed description will be given on the embodiment in the case where the present disclosure is applied to UAV laser survey. In the description, contents that overlap with the description of the first embodiment are basically omitted, and description is given on a difference from the first embodiment.

(3-1. Overview of Information Processing System)

First, an overview of an information processing system according to the third embodiment is described with reference to FIG. 12. Although FIG. 12 does not illustrate the cloud server 300 and the control device 400, the information processing system according to the third embodiment also includes these devices as in the above embodiments.

Figure 12:
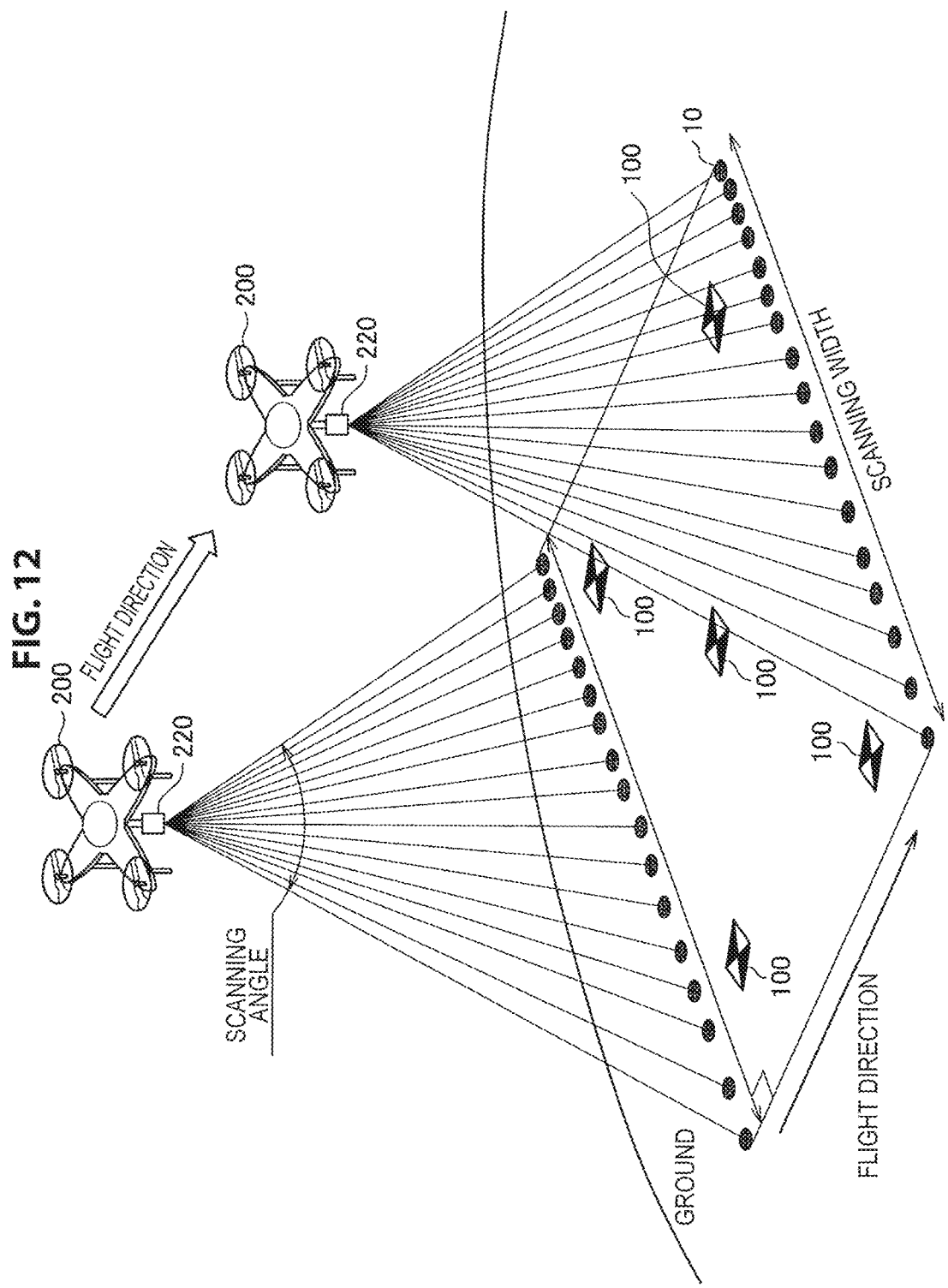
FIG. 12 is a diagram for describing an overview of an information processing system according to a third embodiment.

As illustrated in FIG. 12, the UAV 200 is equipped with a laser sensor 220. The laser sensor 220 is mounted on the UAV 200 so as to be able to apply laser light toward the ground surface, and detect laser light reflected off the ground surface. The laser sensor 220 has a function similar to that of a so-called laser ranging device (also called "laser scanner"). More specifically, the laser sensor 220 is capable of outputting distance information that indicates a separation distance between the laser sensor 220 and each spot on the ground surface on the basis of a time difference between a point in time at which laser light is applied and a point in time at which laser light reflected off the ground surface is detected.

On this occasion, for example, the laser sensor 220 applies a plurality of beams of pulsed laser light in a direction substantially perpendicular to the flight direction of the UAV 200, in a range within a predetermined angle ("scanning angle" in the drawing), as illustrated in FIG. 12. Thus, the laser sensor 220 can acquire linear data extending in the direction substantially perpendicular to the flight direction of the UAV 200. A larger scanning angle enables survey of a wider range. In addition, a higher repetition frequency of pulsed laser light enables survey with higher precision. The repetition frequency of pulsed laser light may be approximately 50 to 100 [kHz], for example, but is not limited to this. Note that the laser sensor 220 may also apply laser light in a direction other than the direction substantially perpendicular to the flight direction, for example, a direction horizontal to the flight direction. This enables the laser sensor 220 to acquire planar data composed of two directions in which laser light is applied.

After the output of distance information by the laser sensor 220 is completed, the distance information and output information (e.g., the magnitude of output) at the time of detecting reflected light, and position information of the UAV 200 and attitude information of the UAV 200 acquired by the GNSS receiver and the IMU mounted on the UAV 200 are uploaded to the cloud server 300. Then, the cloud server 300 generates 3D model data on the basis of the information.

More specifically, the cloud server 300 grasps the position and attitude of the UAV 200 at each point in time during flight, on the basis of position information of the UAV 200 and attitude information of the UAV 200 provided by the GNSS receiver and the IMU. Then, the cloud server 300 combines distance information with the position and attitude of the UAV 200 at the measurement time, thereby outputting point cloud data in an absolute coordinate system at the measurement time.

Here, point cloud data refers to a set of points 10 (normally, regions having some area) on the ground surface, which are uniquely determined by the position and attitude of the UAV 200 and the distance information. If processing precision is high, the points 10 constituting the point cloud data indicate positions on the ground surface where laser light is reflected, as illustrated in FIG. 12 (for convenience, some of the points 10 on the ground surface are omitted from FIG. 12).

Then, the cloud server 300 superimposes point cloud data at each measurement time to generate point cloud data of the entire target region of soil volume survey, and generates provisional 3D model data. Note that in the case where part of the point cloud data is missing, the cloud server 300 may perform processing of interpolating the missing part. Here, an interpolation method is not particularly limited. For example, a known interpolation method such as polynomial interpolation may be used. In addition to superimposing point cloud data at each measurement time, the cloud server 300 may correct position information or attitude information of the UAV 200 using a technology of iterative closest point (ICP). More specifically, the cloud server 300 may use a certain point in point cloud data as an attention point and find a certain point in another piece of point cloud data as a corresponding point, and perform position transformation (e.g., translation and rotation) on point cloud data so that the positions of the points match, thereby correcting position information or attitude information of the UAV 200.

In the third embodiment according to the present disclosure, the precision of the above 3D model data can be improved by associating each point 10 in the point cloud data with a ground position of the survey marker 100. This is described in detail below.

As in the first embodiment and the like, the survey markers 100 are placed in a target region of soil volume survey in advance. A position where the survey marker 100 is placed may be any position within a range that laser light applied by the laser sensor 220 reaches.

In the third embodiment, in a top face of the survey marker 100, a region other than above the antenna 111 is made of a material having higher laser reflectivity than a material of a region above the antenna 111, the ground surface, and the like. Since the region above the antenna 11 is not made of a material having higher laser reflectivity than the material of the region other than above the antenna 111, the possibility of the antenna 11 failing to receive radio signals from GNSS satellites is reduced. Note that a material with high laser reflectivity may be used also for the region above the antenna 111, as in the region other than above the antenna 111, as long as the material has no influence on reception of radio signals from the GNSS satellites.

In the case where the survey marker 100 whose top face is made of a material having higher laser reflectivity than the ground surface and the like is used, when laser light applied by the laser sensor 220 is reflected off the top face of the survey marker 100, the output of the laser sensor 220 that has detected the reflected light is larger than the output when reflected light reflected off a place other than the top face of the survey marker 100 (e.g., the ground surface) is detected. Therefore, the cloud server 300 can detect the point 10 corresponding to the survey marker 100 from among the points 10 in the point cloud data. That is, the top face of the survey marker 100 being made of a material having higher laser reflectivity than the ground surface and the like, as described above, can be expressed in other words as follows: the top face of the survey marker 100 is made of a material having laser reflectivity corresponding to detection of the survey marker 100 using laser light.

Since the cloud server 300 can output ground position information of each survey marker 100 by the method of the first embodiment or the second embodiment, the cloud server 300 can associate the point 10 with ground position information of the survey marker 100 using information on the point 10 corresponding to the survey marker 100 and ground position information of each survey marker 100. This processing makes it possible to correct the provisionally generated 3D model data. More specifically, the cloud server 300 can use ground position information of each survey marker 100 to correct the absolute coordinates of each point 10 corresponding to the ground position information, thereby correcting deviation of the 3D model in the horizontal direction or the vertical direction or distortion etc. of the 3D model. According to the above description, the cloud server 300 can improve the precision of 3D model data.

Furthermore, the cloud server 300 can improve the precision of position information of the UAV 200. More specifically, the cloud server 300 can perform, on the corrected 3D model data, inverse operation using distance information used in the above processing (information indicating a separation distance between the UAV 200 and each spot in the corrected 3D model), thereby correcting position information (or attitude information) of the UAV 200. According to the above description, the cloud server 300 can improve the precision of position information of the UAV 200.

The GNSS receiver and the IMU mounted on the UAV 200 may be inferior in performance to a GNSS receiver and an IMU mounted on a manned aircraft etc. or the GNSS receiver mounted on the survey marker 100, because of cost limits or physical limits (e.g., size limits and weight limits); therefore, position information and attitude information of the UAV 200 may have low precision. Hence, the correction of position information (or attitude information) of the UAV 200 using the above method is particularly useful in UAV laser survey.

Although the above description is given on a method in which the top face of the survey marker 100 is made of a material having higher laser reflectivity than the ground surface and the like, any method may be used, as long as the method can detect the point 10 corresponding to the survey marker 100 from among the points 10 in the point cloud data. For example, the top face of the survey marker 100 may be made of a material having lower laser reflectivity than the ground surface and the like. Thus, the output of the laser sensor 220 that has detected the reflected light is smaller than the output when reflected light reflected off a place other than the top face of the survey marker 100 (e.g., the ground surface) is detected. Therefore, the cloud server 300 can detect the point 10 corresponding to the survey marker 100 from among the points 10 in the point cloud data. That is, the top face of the survey marker 100 being made of a material having lower laser reflectivity than the ground surface and the like, as described above, can be expressed in other words as follows: the top face of the survey marker 100 is made of a material having laser reflectivity corresponding to detection of the survey marker 100 using laser light.

(3-2. Functional Configuration of Each Device)

The overview of the information processing system according to the third embodiment has been described. Now, a functional configuration of each device according to the third embodiment will be described. Note that, as mentioned above, contents that overlap with the description of the first embodiment are basically omitted, and description is given on a difference from the first embodiment. Although described below is a case where the method of the first embodiment (the static method) is used for calculating a ground position of the survey marker 100, the method of the second embodiment (the RTK method) may be used.

(Functional Configuration of Cloud Server 300)

First, a functional configuration of the communication unit 310 is described. In the third embodiment, in the case where the surveyor uploads distance information and output information at the time of detecting reflected light, position information and attitude information of the UAV 200, and RAW data output by each survey marker 100, the communication unit 310 receives the various types of information. The communication unit 310 provides the received various types of information to the information acquisition unit 320 described later.

The information acquisition unit 320 acquires various types of information. For example, the information acquisition unit 320 acquires the various types of information received by the communication unit 310 by reading the information from a memory or the like, and provides the information to the processing unit 330 described later.

The processing unit 330 performs various types of processing related to soil volume survey. More specifically, the processing unit 330 grasps the position and attitude of the UAV 200 at each point in time during flight, on the basis of position information and attitude information of the UAV 200. Then, the processing unit 330 combines distance information with the position and attitude of the UAV 200 at the measurement time, thereby outputting point cloud data in an absolute coordinate system at the measurement time. Then, the processing unit 330 superimposes point cloud data at each measurement time to generate point cloud data of the entire target region of soil volume survey, thereby generating provisional 3D model data. Note that as described above, in the case where part of the point cloud data is missing, the processing unit 330 may perform processing of interpolating the missing part.

Figure 13:
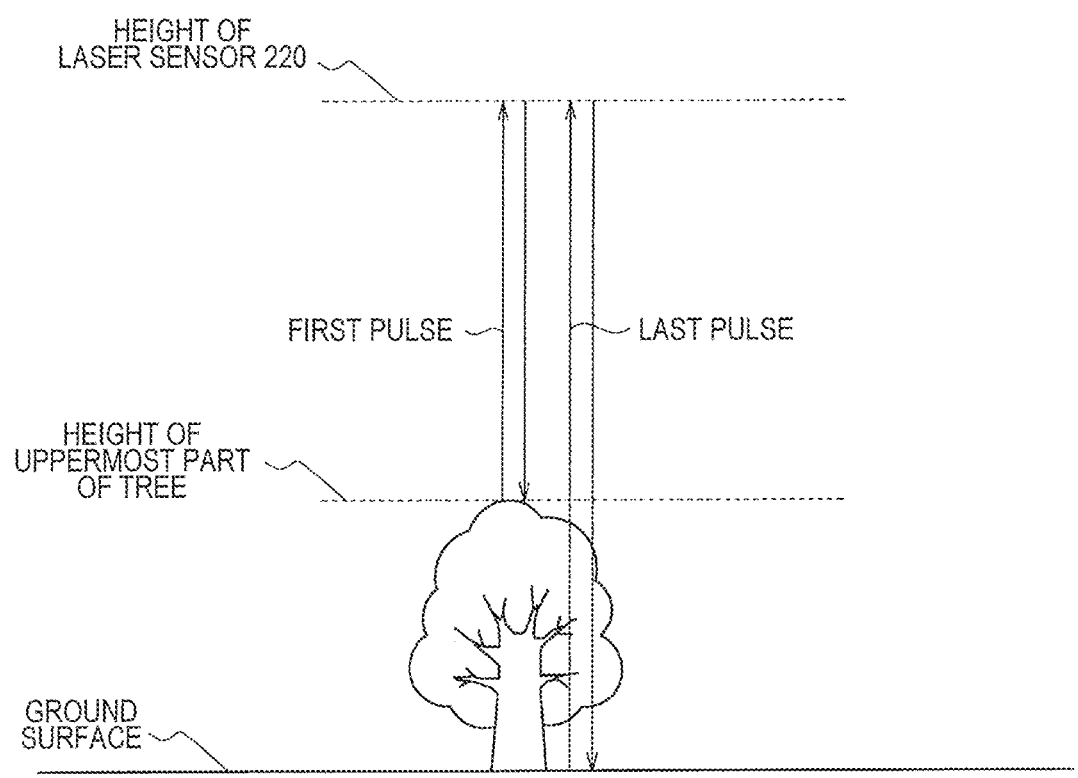
FIG. 13 is a diagram for describing reflection of laser light applied from a laser sensor.

Here, generated 3D model data is a ground surface model including trees, buildings, and the like, that is, a digital surface model (DSM). More specifically, as illustrated in FIG. 13, laser light applied from the laser sensor 220 is reflected off the surfaces of trees, buildings, and the like as well as the ground surface. For example, laser light applied to a tree is not only reflected off the uppermost part of the tree but also reflected off various places such as leaves or branches of the tree, and is finally reflected off the ground surface. As illustrated in FIG. 13, laser light that is reflected off the uppermost part of the tree and detected by the laser sensor 220 is called a first pulse, and laser light that is finally reflected off the ground surface and detected by the laser sensor 220 is called a last pulse. According to the above description, point cloud data and 3D model data generated on the basis of distance information provided by the laser sensor 220 are DSMs including trees, buildings, and the like.

Here, a specific example of a DSM is described with reference to FIGS. 14 and 15. In a DSM, a portion including trees, buildings, and the like (a portion indicated by a reference numeral "20" in the drawing) serves as a target of survey, as illustrated in 14A of FIGS. 14, and 3D model data illustrated in 15A of FIG. 15 is generated.

Here, the processing unit 330 may perform processing of converting 3D model data that is a DSM into a ground surface model from which trees, buildings, and the like are removed, that is, a digital elevation model (DEM). Note that a method for converting a DSM to a DEM is not particularly limited, and a known technology may be used. For example, the processing unit 330 may use a predetermined filter to separate point cloud data into ground point cloud data (point cloud data from which trees, buildings, and the like are removed) and non-ground point cloud data (point cloud data of the trees, buildings, and the like) on the basis of feature values of the trees, buildings, and the like, and output the ground point cloud data as point cloud data of a DEM. Note that a worker may check the above separation result, and manually adjust parameters of the filter, for example, as appropriate to improve the precision of separation processing.

Figure 14:
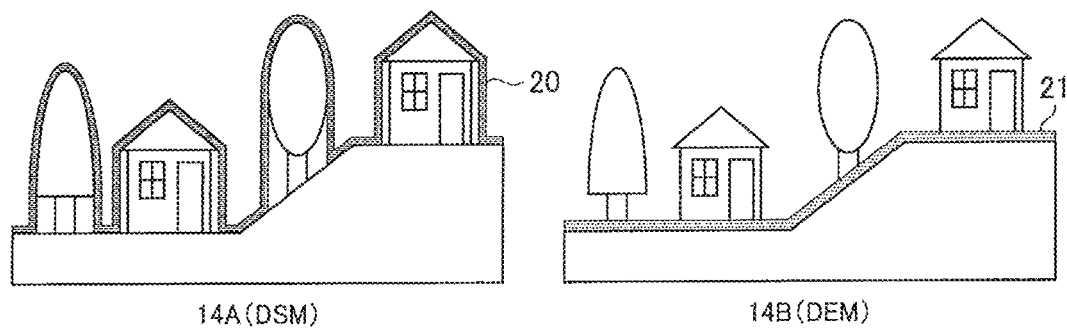
FIG. 14 is a diagram for describing a DSM and a DEM.

In a DEM, a portion from which trees, buildings, and the like are removed (a portion indicated by a reference numeral "21" in the drawing) serves as a target of survey, as illustrated in 14B of FIGS. 14, and 3D model data illustrated in 15B of FIG. is generated.

In addition, the processing unit 330 detects the point 10 corresponding to the survey marker 100 from among the points 10 in the point cloud data, on the basis of output information at the time of detecting reflected light. Furthermore, the processing unit 330 performs positioning processing etc. by the static method using uploaded RAW data, thereby measuring a ground position of each survey marker 100, as in the first embodiment.

Then, the processing unit 330 corrects the provisionally generated 3D model data using information on the point 10 corresponding to the survey marker 100 and ground position information of each survey marker 100, thereby generating final 3D model data. More specifically, the processing unit 330 uses ground position information of each survey marker 100 to correct the absolute coordinates of each point 10 corresponding to the ground position information, thereby correcting deviation of the 3D model in the horizontal direction or the vertical direction or distortion etc. of the 3D model. In this manner, the final 3D model data is generated. The processing unit 330 performs processing related to soil volume survey using the final 3D model data.

Note that functional configurations of the control unit 340 and the storage unit 350 are basically the same as those in the first embodiment, and description thereof is omitted.

(Functional Configurations of Other Devices)

As described above, the laser sensor 220 is provided in the UAV 200 so as to be able to apply laser light toward the ground surface, and detect laser light reflected off the ground surface. In a top face of the survey marker 100, a region other than above the antenna 111 is made of a material having higher laser reflectivity than the ground surface and the like. Functional configurations of the position measurement unit 110 and the control device 400 are the same as those in the first embodiment, and description thereof is omitted.

(3-3. Procedure and Operation of Each Device in Soil Volume Survey)

The functional configuration of each device according to the third embodiment has been described. Now, a procedure and operation of each device in soil volume survey of the third embodiment will be described. Although described below is a case where the method of the first embodiment (the static method) is used for calculating a ground position of the survey marker 100, the method of the second embodiment (the RTK method) may be used.

Figure 16:
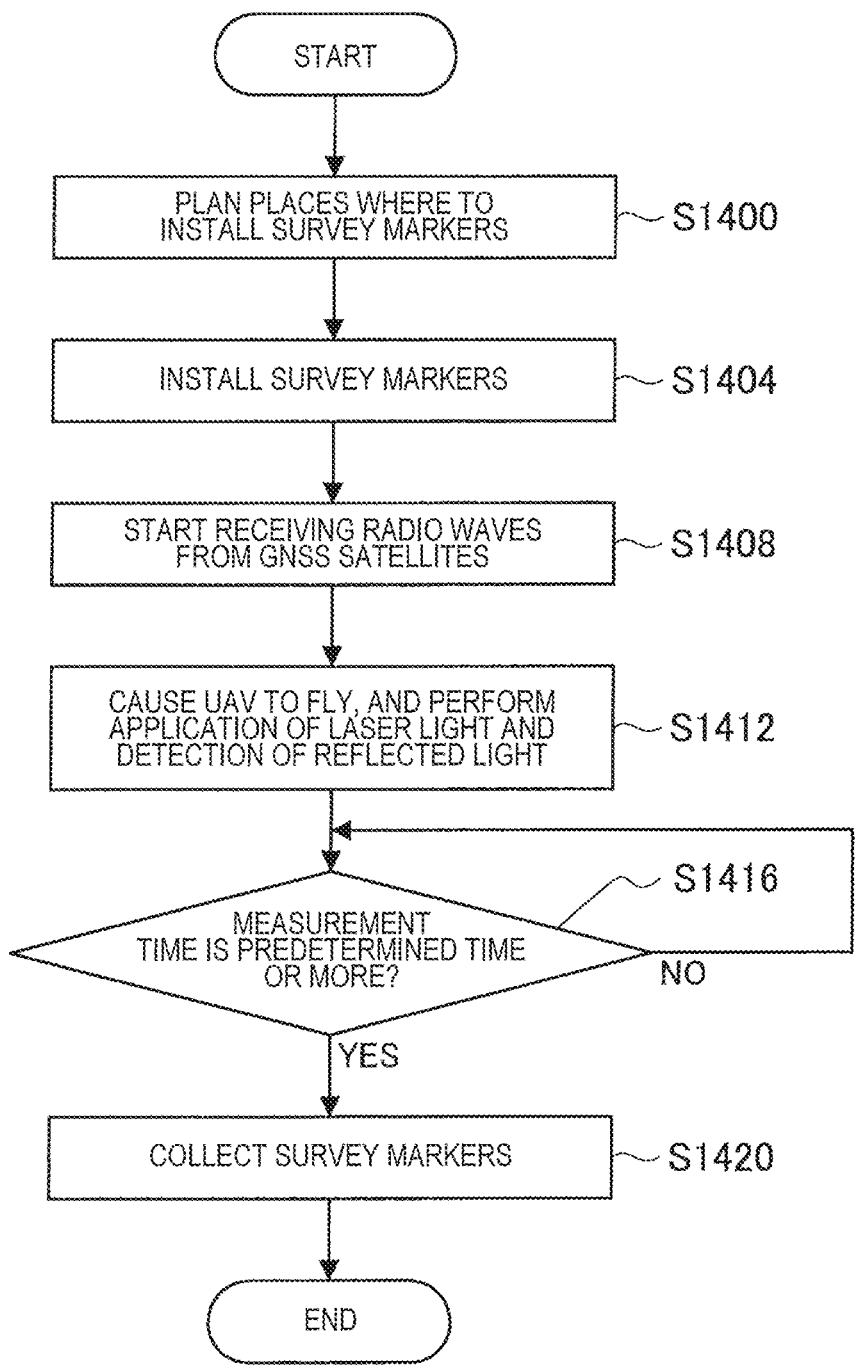
FIG. 16 is a flow chart illustrating a procedure and operation of each device of UAV laser survey in the third embodiment.

First, description is given on a procedure until collection of the survey markers 100, with reference to FIG. 16. A procedure of steps S1400 to S1408 is the same as the procedure of steps S1000 to S1008 in FIG. 7 in the first embodiment, and description thereof is omitted. In step S1412, after all the survey markers 100 are installed, the UAV 200 flies over the zone to be surveyed in accordance with a flight path planned beforehand. Then, during flight, the laser sensor 220 applies laser light to the ground surface, and then detects laser light reflected off the ground surface. The laser sensor 220 generates, using the detection result, distance information and output information (e.g., the magnitude of output) at the time of detecting reflected light.

In addition, in step S1416, in the case where the surveyor determines that generation of distance information and output information by the laser sensor 220 has been completed normally and the position measurement unit 110 has received radio signals from the GNSS satellites for a predetermined time (e.g., one hour) or more (step S1416/Yes), in step S1420, the position measurement unit 110 ends the reception of radio signals from the GNSS satellites, and the survey markers 100 are collected. Thus, since each survey marker 100 has the position measurement unit 110, the laser sensor 220 can apply laser light and detect reflected light to generate distance information and output information at the same time as and in parallel with the reception of radio signals from the GNSS satellites by the position measurement unit 110 of each survey marker 100.

Figure 17:
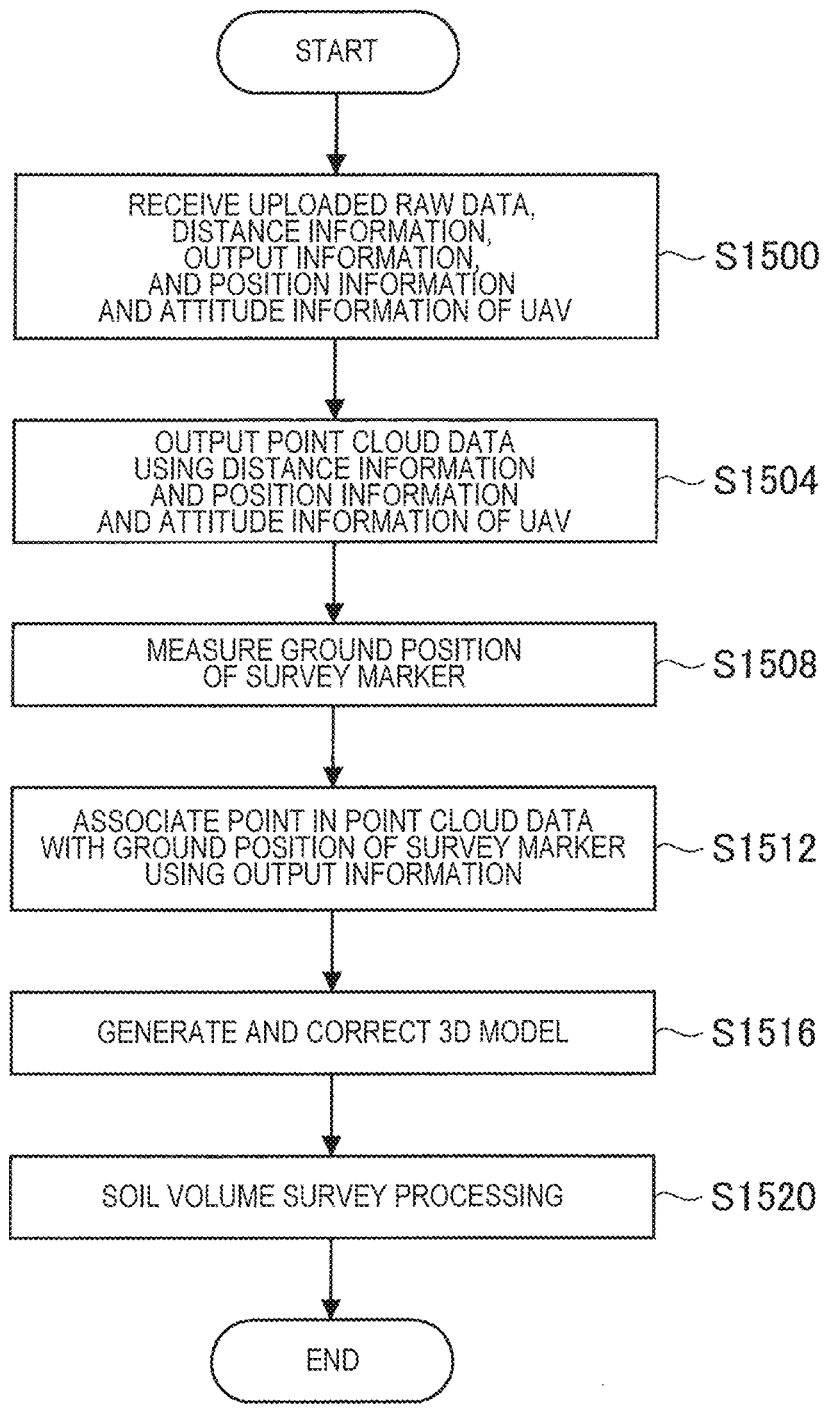
FIG. 17 is a flow chart illustrating a procedure and operation of each device of UAV laser survey in the third embodiment.

Now, description will be given on a processing procedure for the cloud server 300 to perform generation of 3D model data and the like, with reference to FIG. 17.

First, RAW data acquired from a plurality of survey markers 100, distance information and output information acquired from the laser sensor 220, and position information and attitude information of the UAV 200 acquired from the GNSS receiver and the IMU mounted on the UAV 200 are uploaded to the cloud server 300.

In step S1500, the communication unit 310 of the cloud server 300 receives the uploaded various types of information. In step S1504, the processing unit 330 combines the distance information with the position information and attitude information of the UAV 200, thereby outputting point cloud data in an absolute coordinate system.

In step S1508, the processing unit 330 performs positioning processing by the static method using the RAW data received by the GNSS receiver 112 of each survey marker 100, thereby measuring a ground position of each survey marker 100. In step S1512, the processing unit 330 detects the point 10 corresponding to the survey marker 100 from among the points 10 in the point cloud data, on the basis of the output information acquired from the laser sensor 220, and associates the point with a ground position of the survey marker 100.

In step S1516, the processing unit 330 generates 3D model data. More specifically, the processing unit 330 superimposes point cloud data at each measurement time to generate point cloud data of the entire target region of soil volume survey, thereby generating provisional 3D model data. Then, the processing unit 330 corrects the provisionally generated 3D model data using information on the association between the point 10 and the ground position of the survey marker 100, thereby generating final 3D model data.

In step S1520, the processing unit 330 performs processing related to soil volume survey using the generated 3D model data. For example, the processing unit 330 compares 3D model data with a land formation plan drawn by 3D CAD, and calculates a difference or the like.

4. MODIFICATION EXAMPLE OF SURVEY MARKER

Figure 18A:
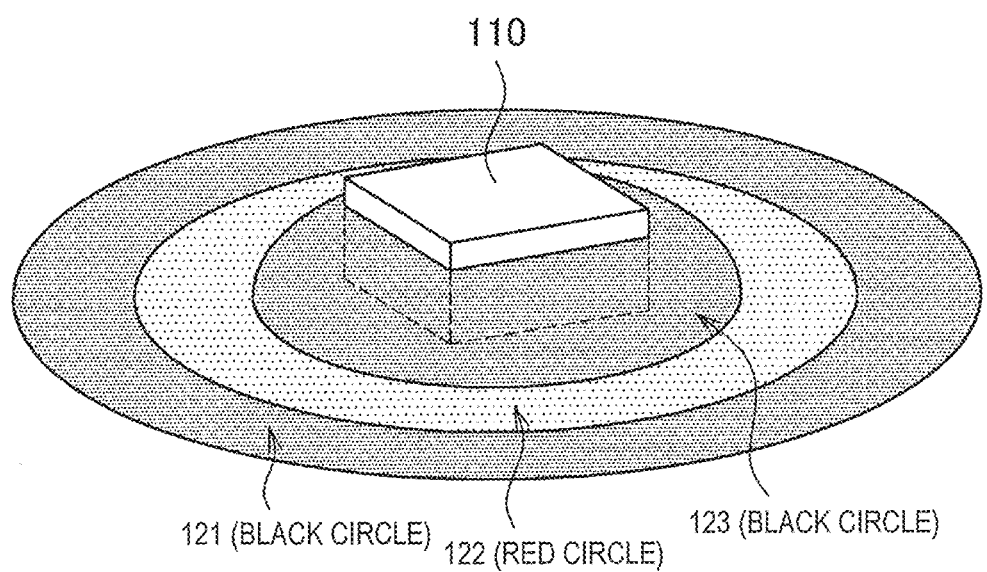
FIG. 18A illustrates a modification example of a survey marker.
Figure 18B:
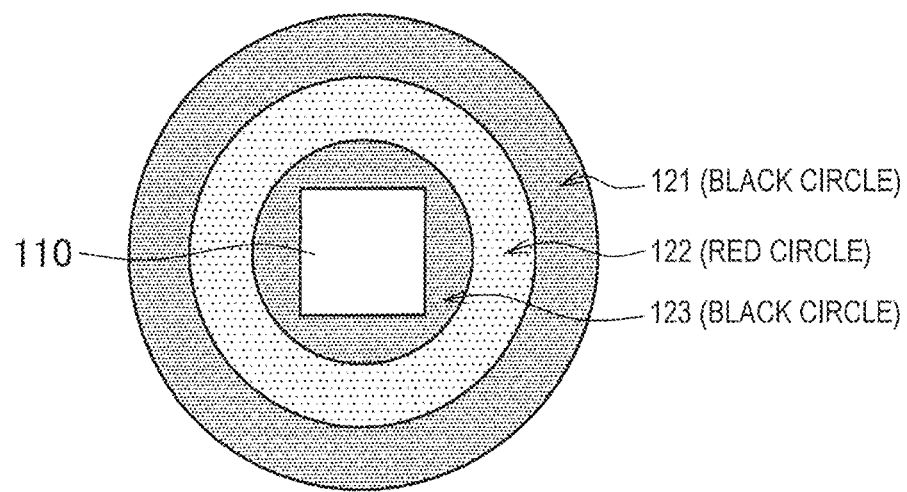
FIG. 18B illustrates a modification example of a survey marker.
Figure 18C:
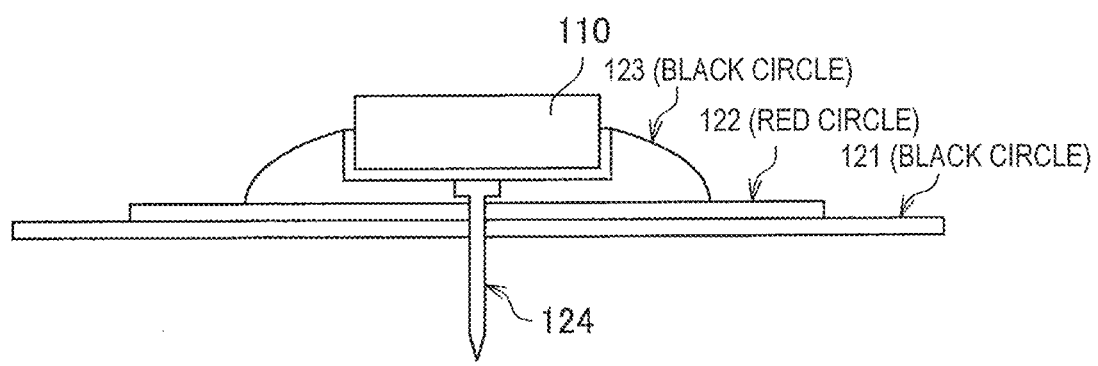
FIG. 18C illustrates a modification example of a survey marker.

The third embodiment according to the present disclosure has been described. Now, a modification example of the survey marker 100 will be described with reference to FIGS. 18A to 18C. FIGS. 18A to 18C illustrate a modification example of the survey marker 100.

The survey marker 100 illustrated in FIGS. 18A to 18C includes the position measurement unit 110 and a survey marker part 120. The survey marker part 120 includes a black-circle region 121, a red-circle region 122, a black-circle region 123, and a stake 124. Here, the black-circle region 121, the red-circle region 122, and the black-circle region 123 differ in size; the black-circle region 121 is the largest, the red-circle region 122 is the second largest, and the black-circle region 123 is the smallest. These components are overlapped; thus, in the case where the survey marker 100 is aerially photographed, an image of a shape in which a plurality of circles having different radii are placed concentrically is captured. In addition, adjacent circles are colored with colors whose hues differ by a predetermined threshold or more, like red and black; thus, the survey marker 100 is easily detected from the captured image.

Here, the black-circle region 123, which is the smallest, has a structure in which the position measurement unit 110 with a predetermined casing is installed to be separable. The surveyor installs the black-circle region 121, the red-circle region 122, and the black-circle region 123 overlapped, and drives in the stake 124 to penetrate them, thereby fixing them, and then installs the position measurement unit 110 above the black-circle region 123. Note that the black-circle region 121, which is the largest, and the red-circle region 122, which is the second largest, may be integrated.

Since the black-circle region 123 has a structure in which the position measurement unit 110 is installed to be separable, the surveyor can carry the survey marker 100 in a state where the components are separated, which facilitates carrying the survey marker 100. For example, a plurality of persons can carry the separated components in cooperation. In addition, by separating the components, the surveyor can accommodate the survey marker 100 in a smaller size (for example, the surveyor can fold the black-circle region 121 and the red-circle region 122 small and accommodate them).

Furthermore, in the case where some components of the survey marker 100 is broken or faulty, the surveyor can repair only the broken or faulty component, and use, as a substitute, a component of another survey marker 100 that is not broken or faulty. Moreover, the surveyor can easily change whether to use the position measurement unit 110 as in the present embodiment. That is, in the case where the position measurement unit 110 is unnecessary, the surveyor can remove the position measurement unit 110, and perform soil volume survey using only the black-circle region 121, the red-circle region 122, the black-circle region 123, and the stake 124.

In the case where the survey marker 100 illustrated in FIGS. 18A to 18C is used in the third embodiment, for example, the black-circle region 121, the red-circle region 122, and the black-circle region 123 may be made of a material having higher laser reflectivity than the ground surface and the like. Since an upper part of the position measurement unit 110 including the antenna 111 is not made of a material having higher laser reflectivity than the ground surface and the like, the possibility of the antenna 111 failing to receive radio signals from GNSS satellites is reduced. Note that in the case where using a material having higher laser reflectivity than the ground surface and the like for the black-circle region 123, which is the smallest, makes it difficult for the antenna 111 to receive radio signals from the GNSS satellites, only the black-circle region 121 and the red-circle region 122, excluding the black-circle region 123, may be made of a material having higher laser reflectivity than the ground surface and the like. As described above, the survey marker 100 may be made of a material having lower laser reflectivity than the ground surface and the like, instead of a material having high laser reflectivity.

5. APPLICATION EXAMPLES OF INFORMATION PROVIDED FROM POSITION MEASUREMENT UNIT 110

The modification example of the survey marker 100 has been described. As described above, the position measurement unit 110 transmits various types of information, such as a ground position (second ground position) of the own device measured by point positioning and GNSS observation data, to the control device 400 via the wireless communication unit 114. The control device 400 includes a second reception unit that receives the information and a display control unit that controls display of the information, and thus achieves various functions. Hence, now, description will be given on examples of application of information provided from the position measurement unit 110 by the control device 400, with reference to FIGS. 19 and 20.

Figure 19:
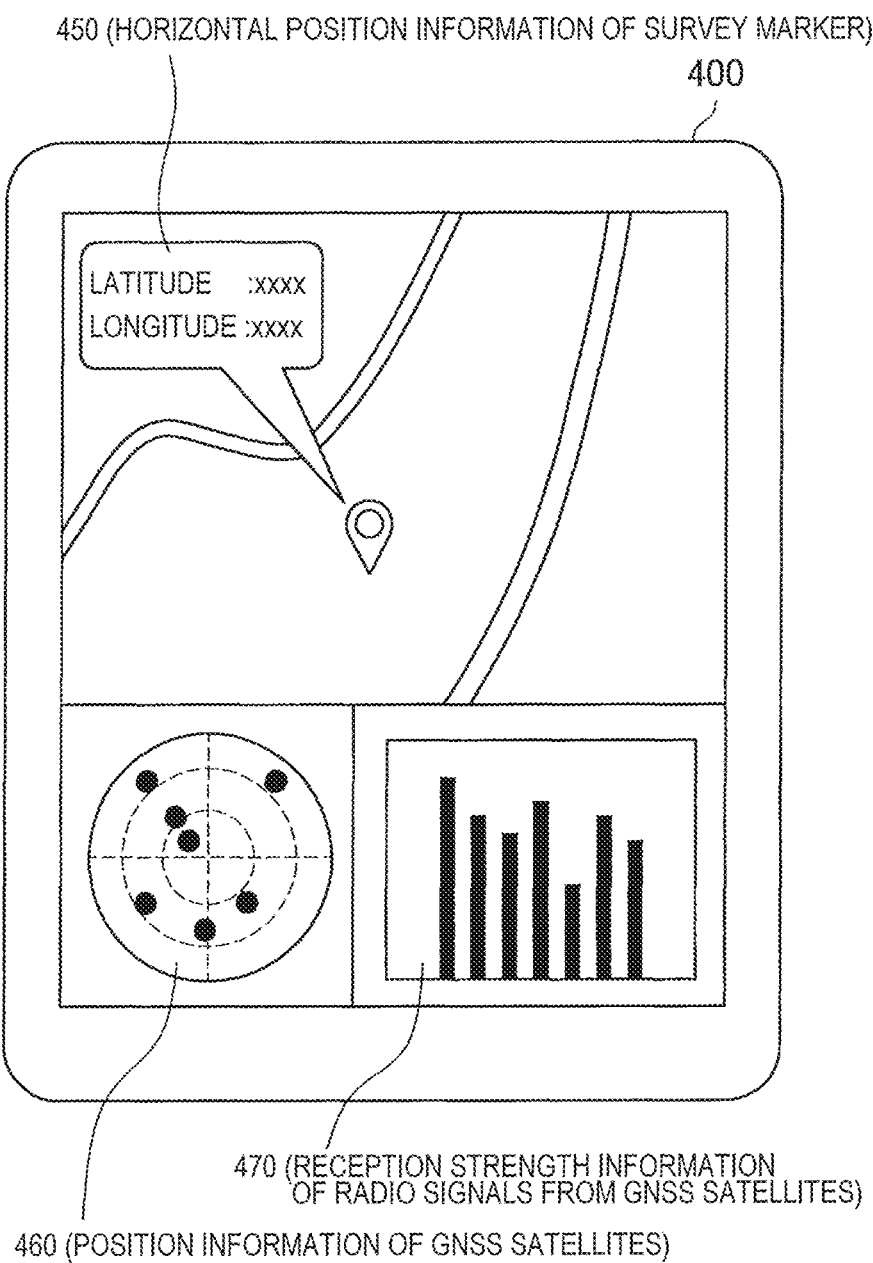
FIG. 19 illustrates an example of application of information provided from a position measurement unit by a control device.

FIG. 19 illustrates an example of application of information provided from the position measurement unit 110 by the control device 400. More specifically, the control device 400 displays, in a region 450 of a display included in the own device, horizontal position (latitude and longitude) information of the survey marker 100. For example, the control device 400 displays a map of a target zone in the region 450, and displays each survey marker 100 on the map on the basis of ground position information from each survey marker 100. Then, when the surveyor selects one of the survey markers 100 displayed on the map, the control device 400 pop-up displays horizontal position information of the survey marker 100 as illustrated in FIG. 19. Note that this is an example, and any information related to the selected survey marker 100 may be displayed. For example, identification information of the survey marker 100, remaining battery power, remaining capacity of a storage medium, the altitude of a spot where the survey marker 100 is installed, or elapsed time from the reception start of GNSS observation data may be displayed.

The surveyor can use such information in various ways. For example, in installing the survey markers 100, the surveyor can check the map or the installation places of other survey markers 100, and thus can easily examine an efficient path for installation. Moreover, in collecting the survey markers 100, the surveyor can grasp ground positions where the survey markers 100 are installed, and thus can efficiently collect the survey markers 100 without wandering. In addition, the surveyor can easily grasp various problems (e.g., a decrease in remaining battery power of the position measurement unit 110, or a decrease in remaining capacity of a storage medium) that obstruct performance of soil volume survey.

Furthermore, in the case where positioning by the static method is performed, for example, the control device 400 can function as a notification unit that notifies the surveyor that a predetermined time (e.g., one hour) has elapsed from the reception start of GNSS observation data, on the basis of elapsed time from the reception start of GNSS observation data, thereby enabling the surveyor to easily grasp timing when the survey markers 100 may be collected.

In addition, as illustrated in FIG. 19, the control device 400 displays position information of GNSS satellites in a region 460 of the display (in the drawing, GNSS satellites are expressed as black circles). For example, the control device 400 displays a mark (black circle) corresponding to a GNSS satellite located closer to a position directly above the survey marker 100 at a position closer to the center of a circle displayed in the region 460. In general, positioning precision decreases as a GNSS satellite goes farther from a position directly above a positioning target. Hence, displaying position information of GNSS satellites enables the surveyor to predict the positioning precision of the survey marker 100, or move the survey marker 100 to a ground position where higher precision can be expected.

Moreover, as illustrated in FIG. 19, the control device 400 displays reception strength information of radio signals from the GNSS satellites in a region 470 of the display. For example, the control device 400 displays, using a bar graph or the like, reception strength of radio signals that the selected survey marker 100 receives from the GNSS satellites. In general, positioning precision decreases as reception strength of radio signals becomes lower. Hence, displaying reception strength of radio signals enables the surveyor to predict the positioning precision of the survey marker 100, or move the survey marker 100 to a ground position where higher precision can be expected, as in the above description.

Described above are examples in which various types of information provided from the position measurement unit 110 are used by the control device 400, but the various types of information may be used by a device other than the control device 400. For example, various types of information provided from the position measurement unit 110 may be used by the UAV 200, the camera 210, or the cloud server 300, or may be used by another device (e.g., the surveyor's smartphone). Moreover, the control device 400 may output the various types of information by another method (a method using sound, light, signals, or the like), instead of displaying the information on a display.

Figure 20A:
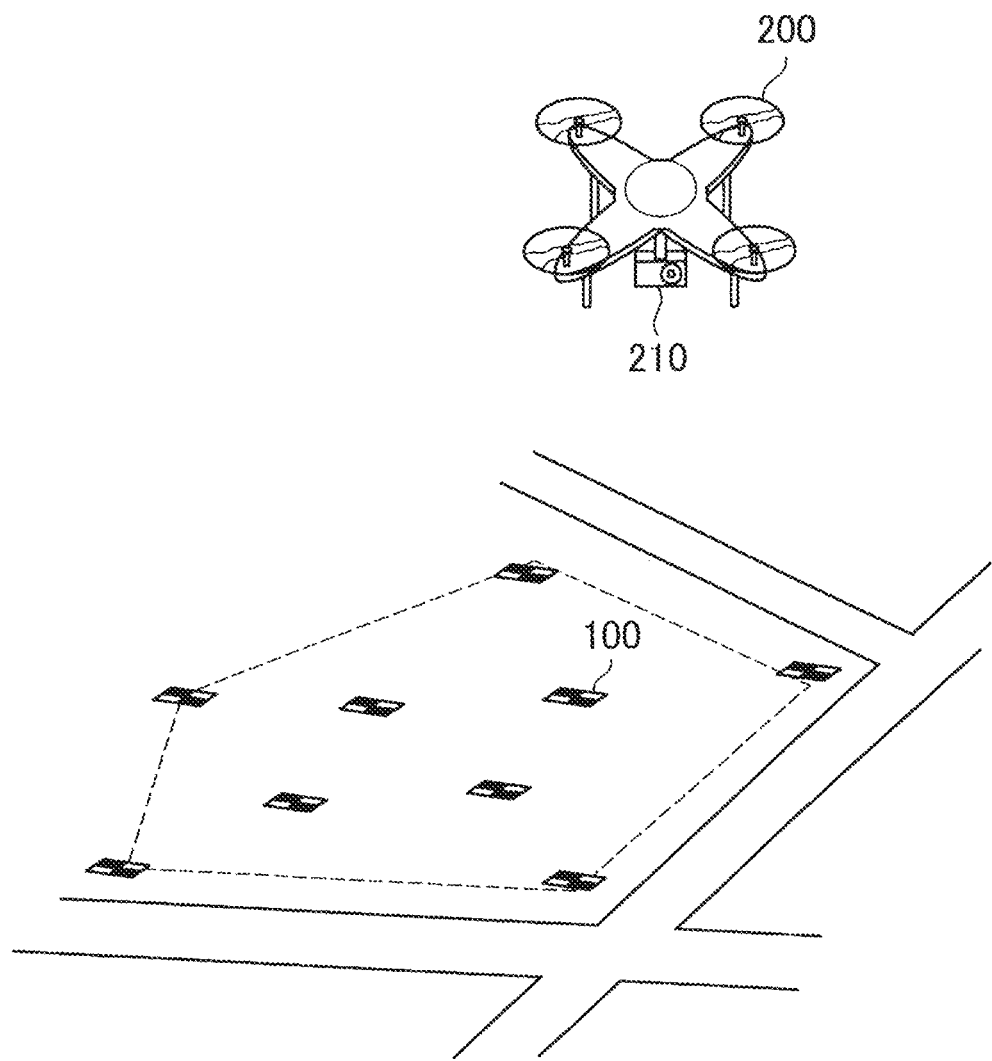
FIG. 20A illustrates an example in which ground position information of a survey marker is used for creation of a flight path of a UAV.
Figure 20B:
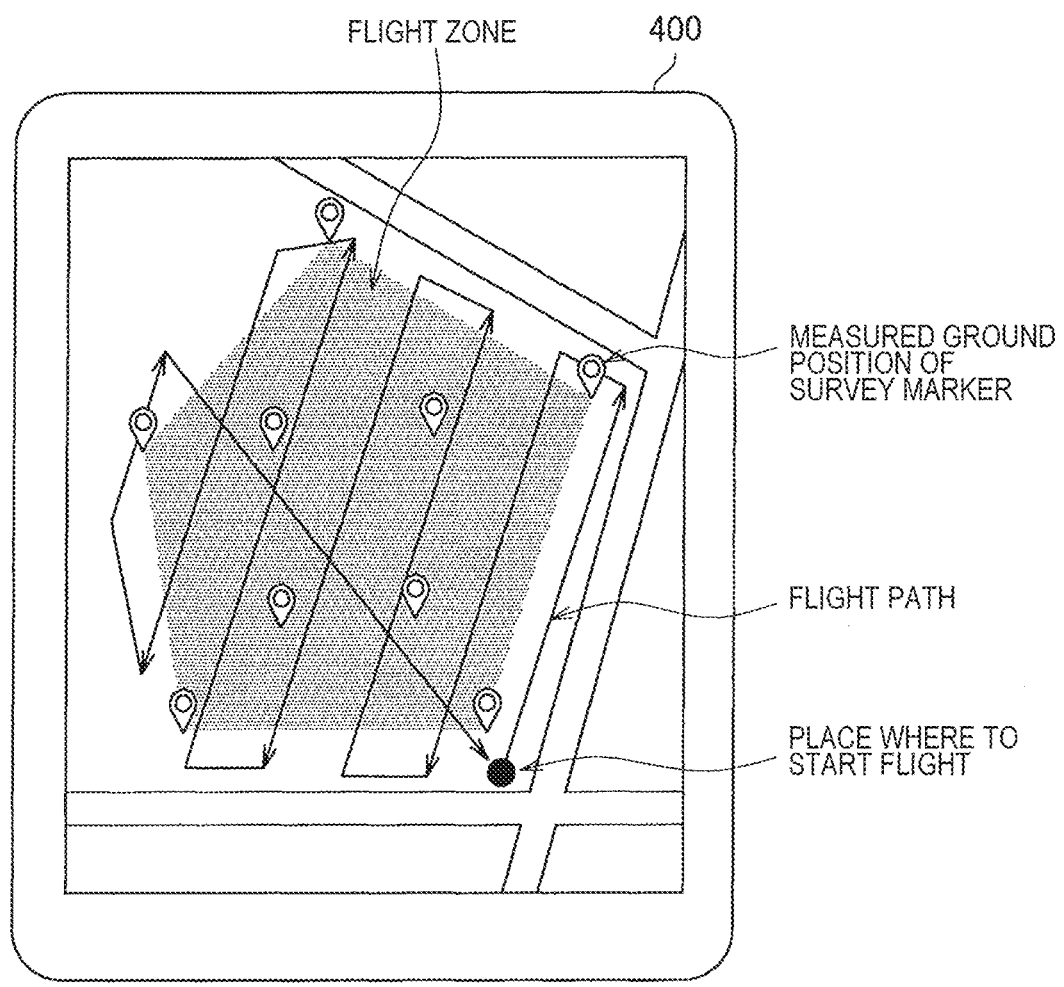
FIG. 20B illustrates an example in which ground position information of a survey marker is used for creation of a flight path of a UAV.

Now, description will be given on an example in which ground position information of the survey marker 100 is used for creation of a flight path of the UAV 200, with reference to FIGS. 20A and 20B. FIGS. 20A and 20B illustrate an example in which ground position information of the survey marker 100 is used for creation of a flight path of the UAV 200.

As illustrated in FIG. 20A, a plurality of survey markers 100 are installed in a target zone of soil volume survey. The control device 400 includes a flight path generation unit that generates a flight path of the UAV 200 in a manner that all the survey markers 100 are aerially photographed. The flight path generation unit can autonomously create a flight path of the UAV 200 using ground position information of each survey marker 100.

More specifically, the control device 400 autonomously calculates a flight path that enables more efficient aerial photography, on the basis of various parameters (e.g., a degree of overlap of captured images (overlap rate, side lap rate), the angle of view of the camera 210, or the flight speed or altitude of the UAV 200) and ground position information of each survey marker 100. Then, the control device 400 sets a region including all the survey markers 100 as a flight zone, and displays the flight zone, a calculation result of the flight path, and the like on a display, as illustrated in FIG. 20B.

Thus, the surveyor can obtain an appropriate flight path of the UAV 200 by only installing the plurality of survey markers 100. In addition, setting the flight zone enables the UAV 200 to fly safely, without going outside the flight zone, by using the flight zone as a geo-fence (a region where flight is allowed).

Note that the surveyor may be able to correct the flight path created by the control device 400, in accordance with the situation (presence or absence of an obstacle, weather situation (e.g., wind direction, wind speed, or rain)) during aerial photography. In addition, the control device 400 may be able to receive feedback from the UAV 200 during flight, and correct the flight path as needed on the basis of the feedback.

6. HARDWARE CONFIGURATION OF EACH DEVICE

The application examples of information provided from the position measurement unit 110 have been described. Now, a hardware configuration of each device will be described with reference to FIG. 21. Various types of processing described above are implemented by cooperation of software and hardware to be described below.

Figure 21:
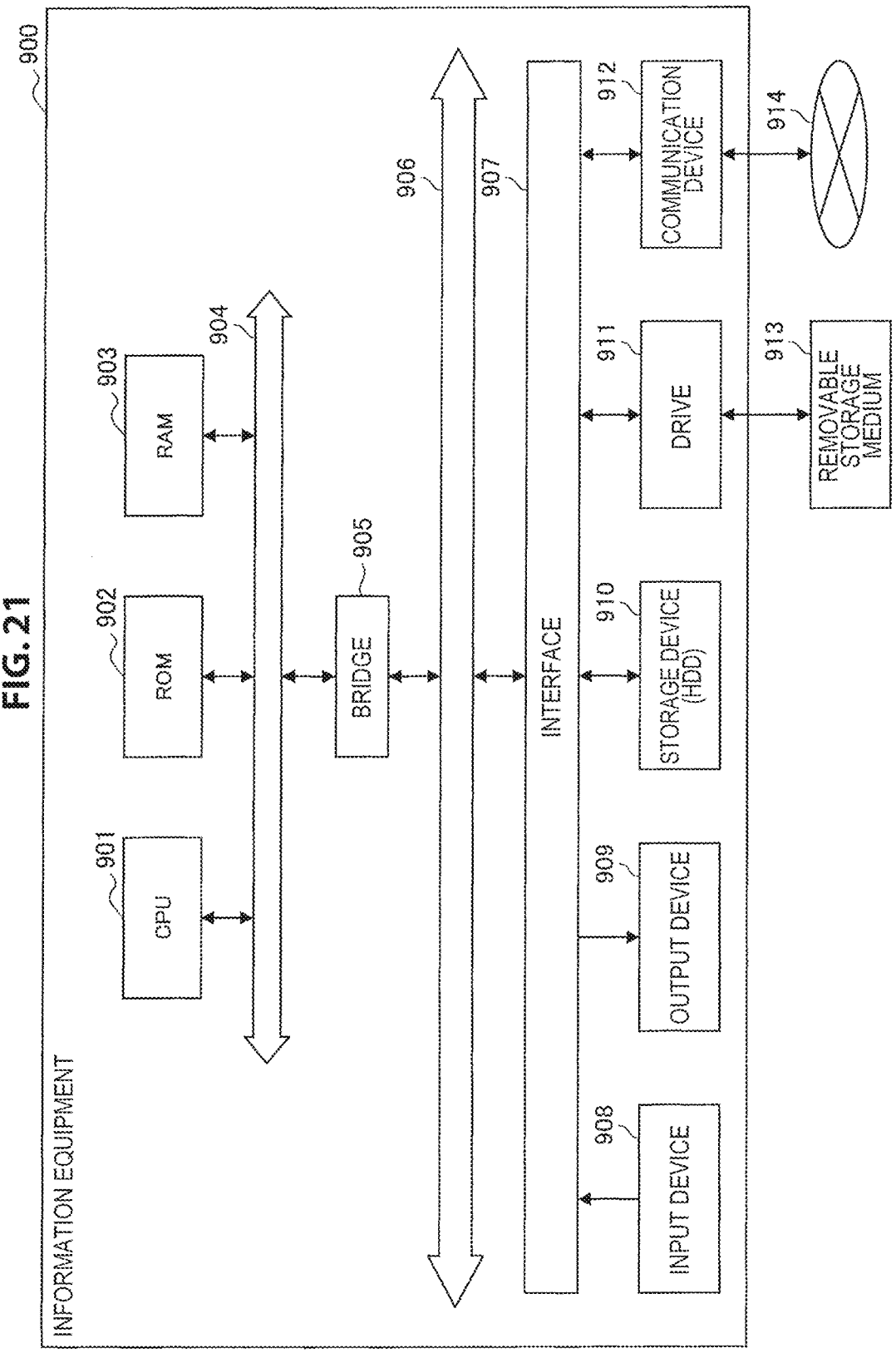
FIG. 21 is a block diagram illustrating a hardware configuration of information equipment that implements a position measurement unit, a cloud server, or a control device according to an embodiment of the present disclosure.

FIG. 21 is a block diagram illustrating a hardware configuration of information equipment 900 that implements the position measurement unit 110, the cloud server 300, or the control device 400 according to an embodiment of the present disclosure. The information equipment 900 includes a central processing unit (CPU) 901, a read only memory (ROM) 902, a random access memory (RAM) 903 and a host bus 904. In addition, the information equipment 900 includes a bridge 905, an external bus 906, an interface 907, an input device 908, an output device 909, a storage device (HDD) 910, a drive 911, and a communication device 912.

The CPU 901 functions as an arithmetic processing device and a control device and controls the overall operation in the information equipment 900 in accordance with various programs. Further, the CPU 901 may be a microprocessor. The ROM 902 stores programs used by the CPU 901, operation parameters and the like. The RAM 903 temporarily stores programs used in execution of the CPU 901, parameters appropriately changed in the execution, and the like. These are connected by the host bus 904 including a CPU bus and the like. The CPU 901, the ROM 902 and the RAM 903 may cooperate with each other to implement the GNSS receiver 112 or the data processing unit 113 of the position measurement unit 110, the information acquisition unit 320, the processing unit 330, or the control unit 340 of the cloud server 300, or the control unit 420 of the control device 400.

The host bus 904 is connected with the external bus 906 such as a peripheral component interconnect/interface (PCI) bus via the bridge 905. Further, the host bus 904, the bridge 905 and the external bus 906 are not necessarily separately configured and such functions may be mounted in a single bus.

The input device 908 includes an input unit for a user to input information, such as a touch panel, a button, a microphone, and a switch, and an input control circuit or the like which generates an input signal on the basis of input by the user and outputs the input signal to the CPU 901. The user of the information equipment 900 may input various types of data or order a processing operation for the information equipment 900 by manipulating the input device 908.

The output device 909 includes, for example, a display device such as a cathode ray tube (CRT) display device, a liquid crystal display (LCD) device, an organic light emitting diode (OLED) device, and a lamp. Furthermore, the output device 909 may include an audio output device, such as a speaker and a headphone. The output device 909 outputs reproduced content, for example. Specifically, the display device displays various types of information such as reproduced video data in text or images. On the other hand, the audio output device converts reproduced audio data into sound and outputs the sound. The output device 909 may implement the display unit 430 of the control device 400.

The storage device 910 is a device for data storage. The storage device 910 may include a storage medium, a recording medium recording data on the storage medium, a reading device for reading data from the storage medium, a deletion device for deleting data recorded on the storage medium and the like. The storage device 910 is formed by, for example, a hard disk drive (HDD). The storage device 910 drives a hard disk to store programs executed by the CPU 901 and various types of data. The storage device 910 may implement the storage unit 115 of the position measurement unit 110, the storage unit 350 of the cloud server 300, or the storage unit 440 of the control device 400.

The drive 911 is a reader/writer for storage media and is externally attached to the information equipment 900. The drive 911 reads information recorded on a removable storage medium 913 such as a magnetic disc, an optical disc, a magneto-optical disc or a semiconductor memory mounted thereon and outputs the information to the RAM 903. In addition, the drive 911 can write information on the removable storage medium 913.

The communication device 912 is a communication interface formed by a communication device for connection to a communication network 914 or the like, for example. The communication device 912 may implement the antenna 111, the GNSS receiver 112, or the wireless communication unit 114 of the position measurement unit 110, the communication unit 310 of the cloud server 300, or the communication unit 410 of the control device 400.

7. CONCLUSION

As described above, the survey marker 100 according to the first embodiment and the second embodiment is equipped with the position measurement unit 110 including a GNSS receiver and thus can measure a ground position of the own device. This enables a surveyor to reduce resources needed for ground survey. In addition, the surveyor can measure ground positions of a plurality of survey markers 100 at the same time in parallel. Moreover, the surveyor can obtain a measurement result with stable precision more easily, even without having expertise like that for ground survey. Furthermore, the surveyor can perform measurement of a ground position of the survey marker 100 and aerial photography at the same time in parallel. According to the above description, an information processing system according to an embodiment of the present disclosure can reduce resources needed for generation of 3D model data and soil volume survey, as compared with an existing technology.

In addition, as in the third embodiment, the present disclosure may be applied to UAV laser survey. The third embodiment associates each point 10 in the generated point cloud data with a ground position of the survey marker 100, and corrects the absolute coordinates of each point 10 in the point cloud data, thereby improving the precision of 3D model data. Furthermore, the third embodiment can improve the precision of position information of the UAV 200 using corrected 3D model data.

It should be understood by those skilled in the art that various modifications, combinations, sub-combinations and alterations may occur depending on design requirements and other factors insofar as they are within the scope of the appended claims or the equivalents thereof.

For example, the steps shown in each flowchart need not be performed in chronological order along the order described in the flowchart. That is, the steps may be performed in an order different from that described in the flowchart, or may be performed in parallel. For example, step S1104 and step S1108 in FIG. 8 may be performed in an order different from that in FIG. 8, or may be performed in parallel.

In addition, some components of the position measurement unit 110 and the cloud server 300 may be provided in an external device as appropriate. Moreover, part of the function of the position measurement unit 110 may be implemented by the data processing unit 113. For example, the data processing unit 113 may implement part of the function of the GNSS receiver 112 or the wireless communication unit 114. Part of the function of the cloud server 300 may be implemented by the control unit 340. For example, the control unit 340 may implement part of the function of the communication unit 310, the information acquisition unit 320, or the processing unit 330.

Moreover, communication forms between the survey marker 100, the position measurement unit 110, the UAV 200, the camera 210, the cloud server 300, and the control device 400 are not limited to the forms described above, and may be changed as appropriate. For example, it is described above that RAW data and captured image data are taken out of the position measurement unit 110 and the camera 210 by the surveyor and uploaded to the cloud server 300; however, without being limited to this, RAW data and captured image data may be directly transmitted from the position measurement unit 110 and the camera 210 to the cloud server 300 by wireless communication, or may be transmitted to the cloud server 300 via the control device 400, for example. In addition, the cloud server 300 may perform wireless communication with the control device 400 to transmit detailed ground position information of the survey marker 100, 3D model data, or a soil volume survey result, for example, to the control device 400.

In addition, the method for collecting the survey markers 100 described above is optional. For example, the survey markers 100 may be collected by the UAV 200. More specifically, ground position information of the own device calculated by point positioning by the position measurement unit 110 included in the survey marker 100 may be acquired by the UAV 200, and the UAV 200 may fly to a ground position at which each survey marker 100 is installed on the basis of the information, and collect each survey marker 100. Here, any method may be used for the UAV 200 to acquire ground position information generated by the position measurement unit 110. For example, the UAV 200 may acquire ground position information of each survey marker 100 by performing wireless communication with the control device 400 that has received ground position information from the position measurement unit 110, or may acquire ground position information of each survey marker 100 by directly performing wireless communication with the position measurement unit 110. In addition, any mechanism may be provided in the UAV 200 to enable collection of the survey markers 100. For example, the UAV 200 may include a mechanism that holds the survey marker 100 and a mechanism that accommodates the survey marker 100.

Moreover, the survey marker 100 may have a movement function. For example, in the case where reception environment of radio signals from the GNSS satellites is poor, the survey marker 100 may be able to autonomously move to a place with better reception environment. In an existing technology, for example, whether favorable radio signals are received is not found until after collection of survey markers. However, providing the position measurement unit 110 in the survey marker 100 as in an embodiment of the present disclosure makes it possible to instantly find whether favorable radio signals are received; hence, the movement function of the survey marker 100 described above is useful. In addition, by the movement function, the survey marker 100 may autonomously move to a planned installation place before work such as aerial photography, and autonomously move to a collection place after work such as aerial photography.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An information processing system including:
a plurality of survey markers each including a GNSS reception unit that receives a signal from a GNSS satellite:
a first position measurement unit that measures a ground position of at least one survey marker on the basis of the signals received by the plurality of survey markers; and
a processing unit that detects the survey marker from a captured image captured by a UAV and including the survey marker, and associates a position of the detected survey marker in the captured image with the ground position.

(2) The information processing system according to (1), in which the first position measurement unit is included in a processing device different from the survey marker, and measures the ground position by an interferometric positioning method.

(3) The information processing system according to (2), in which the first position measurement unit measures the ground position by a static method.

(4) The information processing system according to (3), further including
a notification unit that issues a notification that a predetermined time has elapsed from a start of reception of the signal.

(5) The information processing system according to (2), in which the first position measurement unit measures the ground position by an RTK method.

(6) The information processing system according to (5), in which the first position measurement unit is included in the survey marker.

(7) The information processing system according to any one of (1) to (6), in which the captured image including the survey marker is a captured image captured by the UAV when the GNSS reception unit of the survey marker is receiving the signal.

(8) The information processing system according to any one of (1) to (7), further including
a second position measurement unit that measures a second ground position of the survey marker by a point positioning method on the basis of the signal.

(9) The information processing system according to (8), in which the second position measurement unit is included in the survey marker.

(10) The information processing system according to (8) or (9), further including
an information processing terminal,
in which the information processing terminal includes a second reception unit that receives information on the second ground position, and a display control unit that controls display of the information on the second ground position.

(11) The information processing system according to (10), in which the information processing terminal further includes a flight path generation unit that generates a flight path of a UAV that aerially photographs the survey marker, on the basis of the second ground position.

(12) The information processing system according to (10) or (11), in which the second reception unit also receives information on the signal, and the display control unit also controls display of the information on the signal.

(13) The information processing system according to any one of (1) to (12), in which the GNSS reception unit is provided at substantially the center of the survey marker.

(14) The information processing system according to any one of (1) to (13), in which the GNSS reception unit is provided to be separable from the survey marker.

(15) The information processing system according to any one of (1) to (14), in which the survey marker has a shape in which a plurality of circles having different radii are placed concentrically, and hues corresponding to colors of adjacent circles differ by a predetermined threshold or more, or one of the colors is black.

(16) The information processing system according to any one of (1) to (15), in which the processing unit generates 3D model data of the ground on the basis of information in which the position of the detected survey marker in the captured image is associated with the ground position.

(17) An information processing device including:

a first position measurement unit that measures, on the basis of each of signals from a GNSS satellite received by a plurality of survey markers, a ground position of at least one survey marker; and a processing unit that detects the survey marker from a captured image captured by a UAV and including the survey marker, and associates a position of the detected survey marker in the captured image with the ground position.

(18) An information processing method including:

measuring, on the basis of each of signals from a GNSS satellite received by a plurality of survey markers, a ground position of at least one survey marker; and detecting the survey marker from a captured image captured by a UAV and including the survey marker, and associating a position of the detected survey marker in the captured image with the ground position.

(19) An information processing system including:

a plurality of survey markers each including a GNSS reception unit that receives a signal from a GNSS satellite:

a first position measurement unit that measures a ground position of at least one survey marker on the basis of the signals received by the plurality of survey markers; and a processing unit that detects a point corresponding to the survey marker from point cloud data corresponding to reflection points of laser light, and associates the point with the ground position, the point cloud data being generated by applying a plurality of beams of laser light and detecting reflected light reflected off the ground surface by a laser sensor included in a UAV.

(20) The information processing system according to (19), in which a top face of the survey marker is made of a material having laser reflectivity corresponding to detection of a survey marker using the laser light, and the processing unit detects the point corresponding to the survey marker from the point cloud data on the basis of output at the time of detecting the reflected light.

What is claimed is:

1. A survey marker, comprising:
a global navigation satellite system (GNSS) receiver that receives a signal from a GNSS satellite; and
the survey marker has a predetermined shape and including at least two areas with different properties from one another, wherein
the at least two areas have a different reflectivity from one another,
a ground position of the survey marker is measured by the signals received on the GNSS receiver,
the survey marker is detectable based on the different properties of the at least two areas,
a position of the survey marker, in an image that includes the survey marker, is associated with the ground position,
the at least two areas include a first area and a second area,
the predetermined shape further includes a third area and a fourth area,
the third area has a same reflectivity as the first area,
the fourth area has a same reflectivity as the second area,
the first area, the second area, the third area and the fourth area each has a quadrangle shape,
the first area borders the second area and the fourth area, and
the third area borders the second area and the fourth area.

2. The survey marker according to claim 1, wherein the at least two areas have a different hue from one another.

3. The survey marker according to claim 1, wherein the at least two areas have a different color from one another.

4. The survey marker according to claim 1, wherein
the survey marker includes a plurality of different hued polygonal areas or different colored polygonal areas, and
the survey marker is detected based on the different hued polygonal areas or different colored on the survey marker.

5. The survey marker according to claim 1, wherein the image is captured by an unmanned aerial vehicle (UAV).

6. The survey marker according to claim 5, wherein
the UAV transmits laser light to the at least two areas, and
the UAV receives a reflected laser light that is reflected by the at least two areas.

7. The survey marker according to claim 1, wherein
the survey marker includes a plurality of different hued areas or different colored areas differentiated by perimeters of concentric circles, and
the survey marker is detected based on the different hued areas or different colored areas differentiated by the perimeters of concentric circles on the survey marker.

8. The survey marker according to claim 1, wherein
the first area and the third area has a same color, and
the second area and the fourth area have a same color.

9. The survey marker according to claim 1, wherein
the first area and the third area has a same pattern, and
the second area and the fourth area have a same pattern.

10. A survey marker, comprising:
a global navigation satellite system (GNSS) receiver that receives a signal from a GNSS satellite; and
the survey marker includes a first region and a second region, wherein
the first region includes at least two areas with different properties from one another, the second region is stacked above the first region along a direction perpendicular to a first surface of the first region, a ground position of the survey marker is measured by the signals received on the GNSS receiver, the survey marker is detectable based on the different properties of the at least two areas, and a position of the survey marker, in an image that includes the survey marker, is associated with the ground position.

11. The survey marker according to claim 10, further comprising:

a casing which is separable from the GNSS receiver.

12. The survey marker according to claim 10, wherein the second region includes a second surface which is not parallel to the first surface of the first region.

* * * * *